US012811057B2

(12) United States Patent
Kobayashi et al.

(10) Patent No.: US 12,811,057 B2
(45) Date of Patent: Nov. 24, 2026

(54) REACTOR, CONVERTER, AND POWER CONVERTER DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takehito Kobayashi, Mie (JP); Kazuhiro Inaba, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 536 days.

(21) Appl. No.: 18/564,600

(22) PCT Filed: Jun. 8, 2022

(86) PCT No.: PCT/JP2022/023142
§ 371 (c)(1),
(2) Date: Nov. 27, 2023

(87) PCT Pub. No.: WO2022/260088
PCT Pub. Date: Dec. 15, 2022

(65) Prior Publication Data

US 2024/0379287 A1 Nov. 14, 2024

(30) Foreign Application Priority Data

Jun. 10, 2021 (JP) ................................ 2021-097094

(51) Int. Cl.
*H01F 27/28* (2006.01)
*H01F 27/255* (2006.01)
(Continued)

(52) U.S. Cl.
CPC ......... *H01F 41/061* (2016.01); *H01F 27/255* (2013.01); *H01F 27/306* (2013.01); *H01F 37/00* (2013.01)

(58) Field of Classification Search
CPC .... H01F 41/061; H01F 27/255; H01F 27/306; H01F 37/00; H01F 2027/406; H01F 27/24; H01F 27/28
(Continued)

(56) References Cited

U.S. PATENT DOCUMENTS 7,427,909 B2 * 9/2008 Ono .......................... H01F 1/24 336/90
2010/0321145 A1 * 12/2010 Kaoru ................ H01F 27/2847 29/605
(Continued)

FOREIGN PATENT DOCUMENTS

JP H02-294003 A 12/1990
JP 2012-243913 A 12/2012
(Continued)

OTHER PUBLICATIONS

International Search Report issued on Aug. 9, 2022 for WO 2022/260088 A1 (4 pages).

*Primary Examiner* — Tuyen T Nguyen
(74) *Attorney, Agent, or Firm* — Venjuris, P.C.

(57) ABSTRACT

A reactor includes a coil, a magnetic core and a temperature sensor. The coil includes a first coil portion and a second coil portion. The first coil portion includes a plurality of first turns where a flat wire is wound edgewise. Each of the plurality of first turns includes a first inner peripheral portion
(Continued)

that constructs an inner periphery side of the first turn and a first outer peripheral portion that constructs an outer periphery side of the first turn. The first outer peripheral portion is bent with respect to the first inner peripheral portion so as to be inclined in a first direction. The second coil portion includes a plurality of second turns where the flat wire is wound edgewise.

8 Claims, 13 Drawing Sheets

(51) Int. Cl.
*H01F 27/30* (2006.01)
*H01F 37/00* (2006.01)
*H01F 41/061* (2016.01)

(58) Field of Classification Search
USPC ..................... 336/65, 83, 180, 182, 206–208
See application file for complete search history.

(56) References Cited

U.S. PATENT DOCUMENTS

2017/0352476 A1 12/2017 Inaba et al.
2018/0286573 A1* 10/2018 Miyazaki .............. H01F 41/061
2019/0057810 A1 2/2019 Shitama et al.
2025/0087405 A1* 3/2025 Kobayashi .............. H01F 27/29

FOREIGN PATENT DOCUMENTS

JP 2016-157857 A 9/2016
JP 2018-026504 A 2/2018

* cited by examiner

REACTOR, CONVERTER, AND POWER CONVERTER DEVICE

CROSS REFERENCE TO RELATED APPLICATIONS

This application is a national phase of PCT application No. PCT/JP2022/023142, filed on 8 Jun. 2022, which claims priority from Japanese patent application No. 2021-097094, filed on 10 Jun. 2021, all of which are incorporated herein by reference.

TECHNICAL FIELD

The present disclosure relates to a reactor, a converter, and a power converter device.

BACKGROUND

Patent Document 1 and Patent Document 2 disclose reactors that are equipped with temperature sensors. The reactor according to Patent Document 1 has the temperature sensor attached to the outer peripheral surface of the coil. In the reactor according to Patent Document 2, the temperature sensor is provided on a gap plate disposed in the core.

PRIOR ART DOCUMENT

Patent Document

Patent Document 1: JP 2018-026504 A
Patent Document 2: JP 2019-036696 A

SUMMARY OF THE INVENTION

A reactor according to an aspect of the present disclosure includes: a coil; a magnetic core on which the coil is disposed; and a temperature sensor for measuring a temperature of the coil, wherein the coil includes a first coil portion and a second coil portion that is continuously connected to the first coil portion in an axial direction of the coil, the first coil portion includes a plurality of first turns where a flat wire is wound edgewise into a spiral, each of the plurality of first turns includes a first inner peripheral portion that constructs an inner periphery side of the first turn in the flat wire and a first outer peripheral portion that constructs an outer periphery side of the first turn in the flat wire, the first outer peripheral portion is bent with respect to the first inner peripheral portion so as to be inclined in a first direction in the axial direction of the coil, the second coil portion includes a plurality of second turns where the flat wire is wound edgewise into a spiral, each of the plurality of second turns includes a second inner peripheral portion that constructs an inner periphery side of the second turn in the flat wire and a second outer peripheral portion that constructs an outer periphery side of the second turn in the flat wire, the second outer peripheral portion is bent with respect to the second inner peripheral portion so as to be inclined toward a second direction in the axial direction of the coil, and the temperature sensor is disposed in a space formed between the first coil portion and the second coil portion.

A converter according to an aspect of the present disclosure includes the reactor according to an aspect of the present disclosure.

A power converter device according to an aspect of the present disclosure includes the converter according to an aspect of the present disclosure.

DETAILED DESCRIPTION TO EXECUTE THE INVENTION

Problems to be Solved

Figure 1:
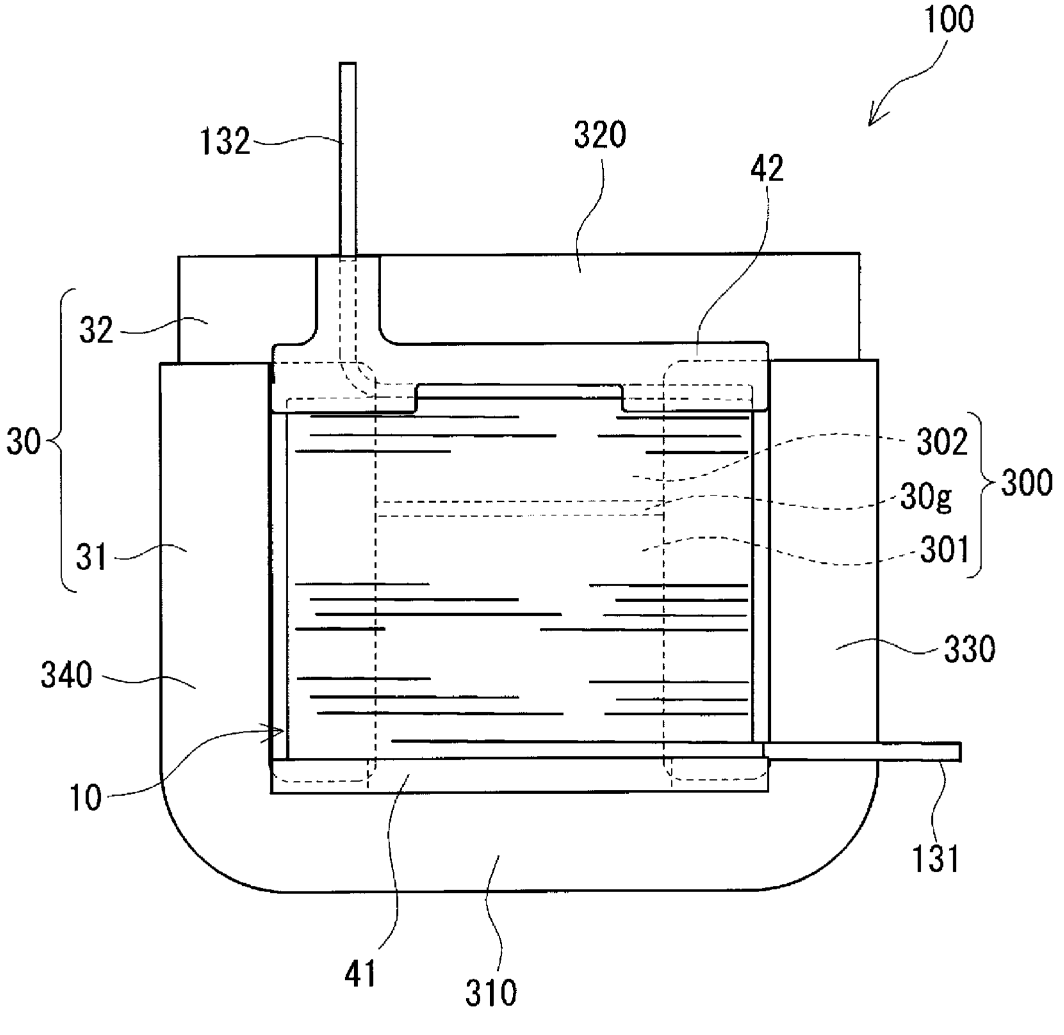
FIG. 1 is a schematic plan view depicting an example of a reactor according to an embodiment.

It is desirable for a reactor provided with a temperature sensor to be constructed so that the reactor can be miniaturized. It is also desirable to measure the temperature of the coil more accurately.

In the reactor of Patent Document 1, the temperature sensor is disposed on the outer peripheral surface of the coil, which results in the reactor including the temperature sensor becoming larger. When the temperature sensor is provided inside a gap plate as in the reactor of Patent Document 2, the thickness of the gap plate will depend on the thickness of the temperature sensor. Since the thickness of the gap plate needs to be equal to or greater than the thickness of the temperature sensor, the thickness of the gap plate increases. As the gap plate becomes thicker, the magnetic resistance of the core will increase and the leakage magnetic flux from the part where the gap plate is provided will increase. With the reactor of Patent Document 2, there is the risk that the desired magnetic characteristics will not be obtained.

It is an object of the present disclosure to provide a reactor that can be miniaturized and in which the temperature of the coil can be accurately measured. It is a further object of the present disclosure to provide a converter including this reactor and a power converter device including this converter.

Effect of the Invention

A reactor according to an aspect of the present disclosure can be miniaturized and can accurately measure the temperature of the coil.

A converter and a power converter device according to aspects of the present disclosure include a reactor that can be miniaturized and can accurately measure the temperature of a coil.

DESCRIPTION OF EMBODIMENTS OF THE DISCLOSURE

First, modes of the present disclosure will be enumerated and described.

(1) A reactor according to an aspect of the present disclosure includes: a coil; a magnetic core on which the coil is disposed; and a temperature sensor for measuring a temperature of the coil, wherein the coil includes a first coil portion and a second coil portion that is continuously connected to the first coil portion in an axial direction of the coil, the first coil portion includes a plurality of first turns where a flat wire is wound edgewise into a spiral, each of the plurality of first turns includes a first inner peripheral portion that constructs an inner periphery side of the first turn in the flat wire and a first outer peripheral portion that constructs an outer periphery side of the first turn in the flat wire, the first outer peripheral portion is bent with respect to the first inner peripheral portion so as to be inclined in a first direction in the axial direction of the coil, the second coil portion includes a plurality of second turns where the flat wire is wound edgewise into a spiral, each of the plurality of second turns includes a second inner peripheral portion that constructs an inner periphery side of the second turn in the flat wire and a second outer peripheral portion that constructs an outer periphery side of the second turn in the flat wire, the second outer peripheral portion is bent with respect to the second inner peripheral portion so as to be inclined toward a second direction in the axial direction of the coil, and the temperature sensor is disposed in a space formed between the first coil portion and the second coil portion.

Since the reactor according to an aspect of the present disclosure has the temperature sensor disposed in the space formed between the first coil portion and the second coil portion, it is possible to miniaturize the reactor.

In the reactor according to an aspect of the present disclosure, the temperature of the coil can be accurately measured. By disposing the temperature sensor in the space described above, it is possible to measure the temperature of the coil or the temperature at a location that is extremely close to the coil.

The reactor according to an aspect of the present disclosure provides a space for disposing the temperature sensor between the first coil portion and the second coil portion. By bending the outer peripheral portions of the first turns and the second turns so as to be inclined in opposite directions, a gap in which the temperature sensor can be disposed is formed between the first coil portion and the second coil portion.

(2) In the reactor according to (1) above, the temperature sensor may be fixed to one of a first turn and a second turn that face each other.

By fixing the temperature sensor to the coil, the configuration according to (2) above enables the temperature of the coil to be measured more accurately.

(3) In the reactor according to (2) above, the temperature sensor may be positioned at one of a first inner peripheral portion and a second inner peripheral portion.

With the configuration according to (3) above, by providing the temperature sensor on an inner periphery side of the coil where the rise in temperature is large, it is possible to measure the temperature of the coil more accurately.

(4) In the reactor according to any one of (1) to (3) above, the magnetic core may include: an inner core portion disposed inside the coil; and a gap portion provided midway in a length direction of the inner core portion, wherein the gap portion may be disposed inside of the space.

The configuration according to (4) enables the temperature of the coil to be measured more accurately. When the magnetic core has a gap portion, leakage magnetic flux is generated from the gap portion. This means that in the vicinity of the gap portion, the temperature of the coil is likely to rise due to the leakage magnetic flux. In the configuration according to (4) above, the temperature of the coil in the vicinity of the gap can be measured.

(5) In the reactor according to any one of (1) to (3) above, the magnetic core may include an inner core portion disposed inside the coil, the inner core portion may include a resin core piece made of a molding of a composite material where soft magnetic powder is dispersed in resin, and the resin core piece may be disposed inside the space.

The configuration according to (5) above enables the temperature of the coil to be measured more accurately. The resin core piece has low thermal conductivity and dissipates heat poorly. When the inner core portion includes a resin core piece, the resin core piece tends to reach a high temperature and the temperature of the coil tends to rise at the part where the resin core piece is located. In the configuration of (5) above, the temperature of the coil can be measured at the part where the resin core piece is located.

(6) In the reactor according to any one of (1) to (5) above, the first turns may include corner portions where the flat wire is bent, and a first displacement in the axial direction of the coil between the first inner peripheral portion and the first outer peripheral portion at the corner portions of the first turns may be 0.1 mm or more and 1.0 mm or less. The second turns may include corner portions where the flat wire is bent, and a second displacement in the axial direction of the coil between the second inner peripheral portion and the second outer peripheral portion at the corner portions of the second turns may be 0.1 mm or more and 1.0 mm or less.

With the configuration according to (6) above, by setting the first displacement of the first turns and the second displacement of the second turns in the ranges stated above, it is easy to provide the space in which the temperature sensor is disposed.

(7) A converter according to an aspect of the present disclosure includes the reactor according to any one of (1) to (6) above.

The converter according to an aspect of the present disclosure includes a reactor that is small and can accurately measure the temperature of the coil.

(8) A power converter device according to an aspect of the present disclosure includes the converter according to (7) above.

By including the converter described above, the power converter device according to an aspect of the present disclosure includes the reactor described above that is small and can accurately measure the temperature of the coil.

DETAILED DESCRIPTION OF EMBODIMENTS OF THE PRESENT DISCLOSURE

Specific examples of a reactor, a converter, and a power converter device according to the present disclosure will now be described with reference to the drawings. The same reference numerals in the drawings indicate the same or corresponding parts.

Note that the present invention is not limited to the embodiments described here and is intended to include all modifications within the meaning and scope of the range of the patent claims and their equivalents.

(Overview of Reactor)

Figure 2:
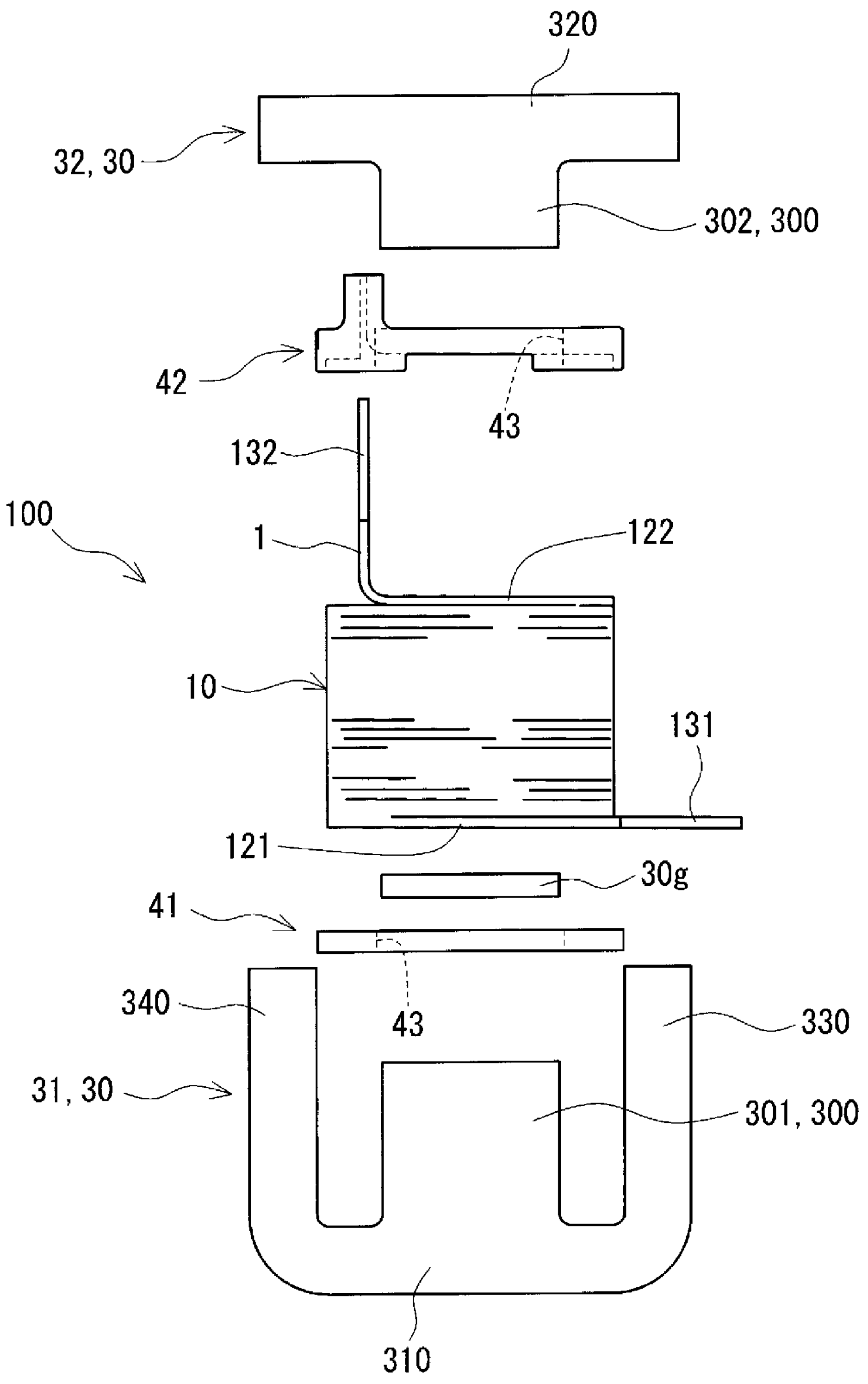
FIG. 2 is a schematic exploded plan view depicting one example of a reactor according to the present embodiment.
Figure 3:
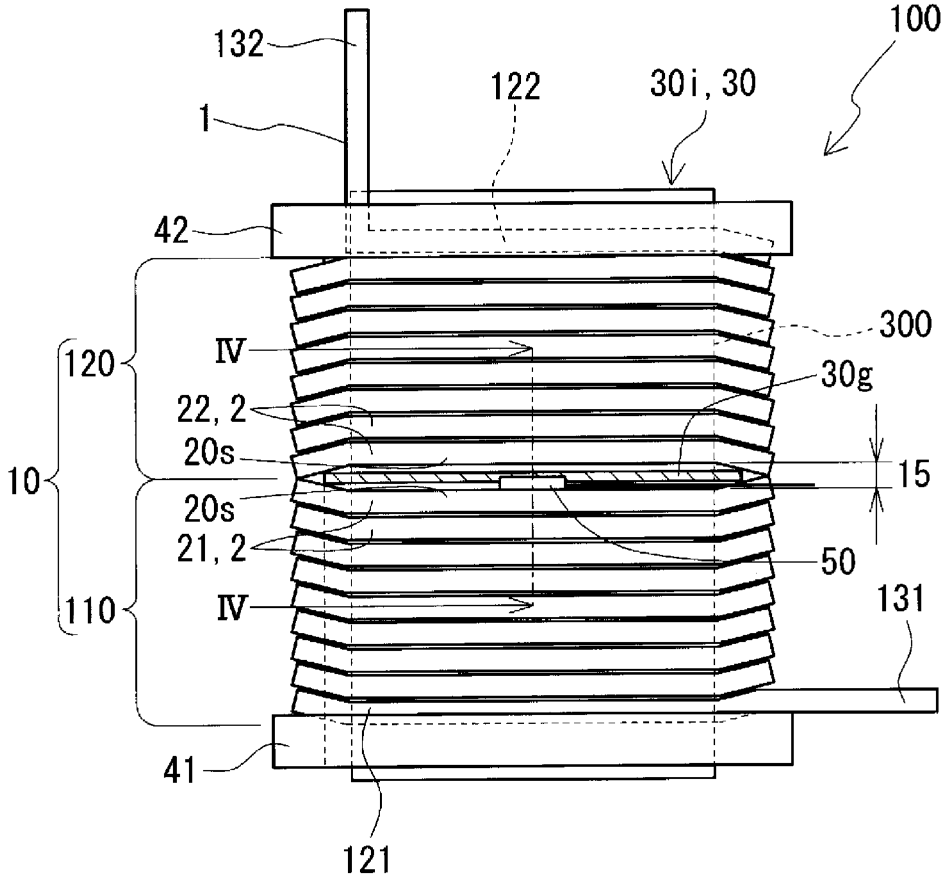
FIG. 3 is a schematic plan view depicting a principal part of a reactor according to an embodiment.
Figure 4:
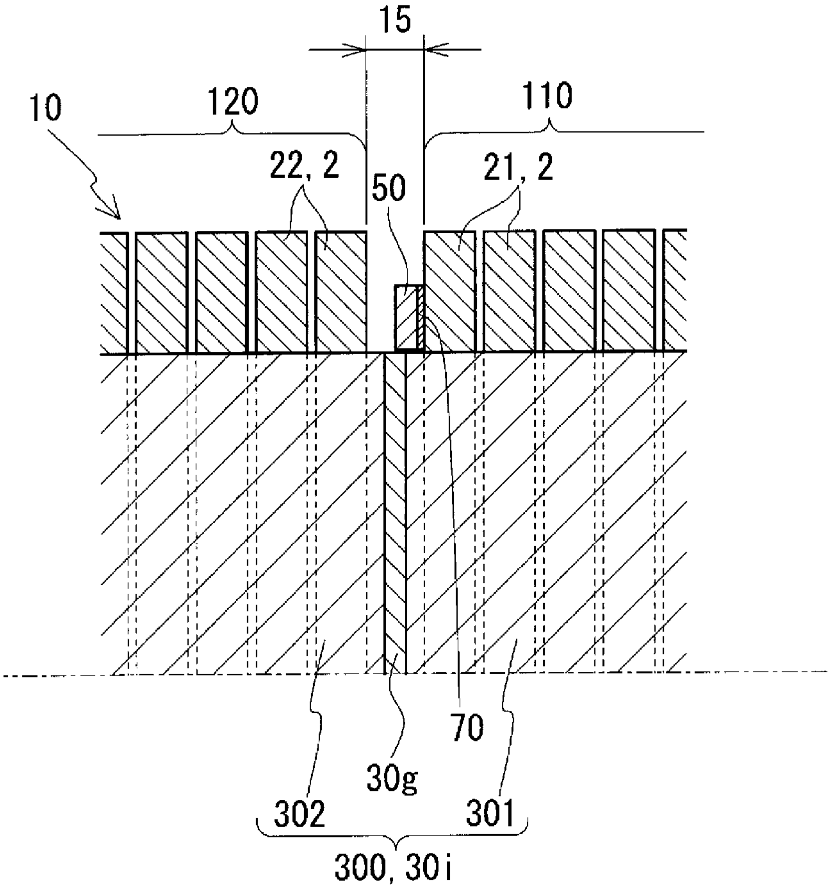
FIG. 4 is a cross-sectional view taken along a line IV-IV in FIG. 3.

An overview of a reactor 100 according to an embodiment is given below, mainly with reference to FIGS. 1 to 4. As depicted in FIGS. 1 and 2, the reactor 100 includes a coil 10 and a magnetic core 30. The magnetic core 30 is configured with an overall θ (the Greek letter theta) shape. As depicted in FIGS. 3 and 4, the reactor 100 also includes a temperature sensor 50. The coil 10 includes a first coil portion 110 and a second coil portion 120. One feature of the reactor 100 is that the temperature sensor 50 is disposed in a space 15 formed between the first coil portion 110 and the second coil portion 120. The configuration of the reactor 100 is described in detail below.

In FIGS. 3 and 4, the members that construct the reactor 100 have been simplified. In FIG. 3, out of the magnetic core 30, only an inner core portion 30*i*, which is disposed inside the coil 10, is illustrated. In FIG. 3, a gap portion 30*g* has been diagonally shaded for ease of understanding. In the present embodiment, the inner core portion 30*i* is a middle core portion 300 appearing in FIGS. 1 and 2. In the present embodiment, the side where the temperature sensor 50 is disposed is regarded as the "upper side" of the reactor. FIG. 4 depicts only the upper half of a cross-section taken along a line IV-IV in FIG. 3. The line IV-IV in FIG. 3 is a line along the axial direction of the coil 10.

(Coil)

Figure 5:
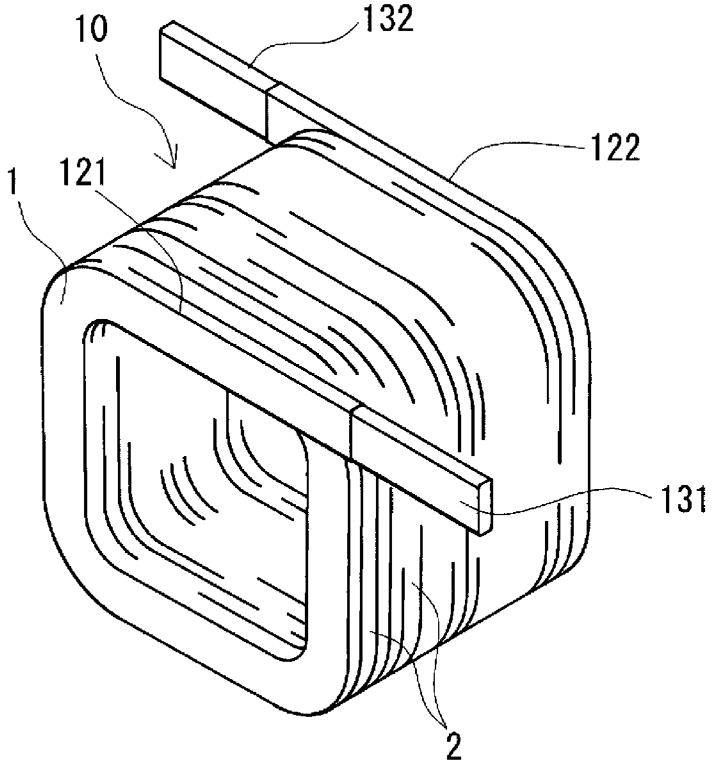
FIG. 5 is a schematic perspective view depicting one example of a coil used in the reactor according to the present embodiment.
Figure 6:
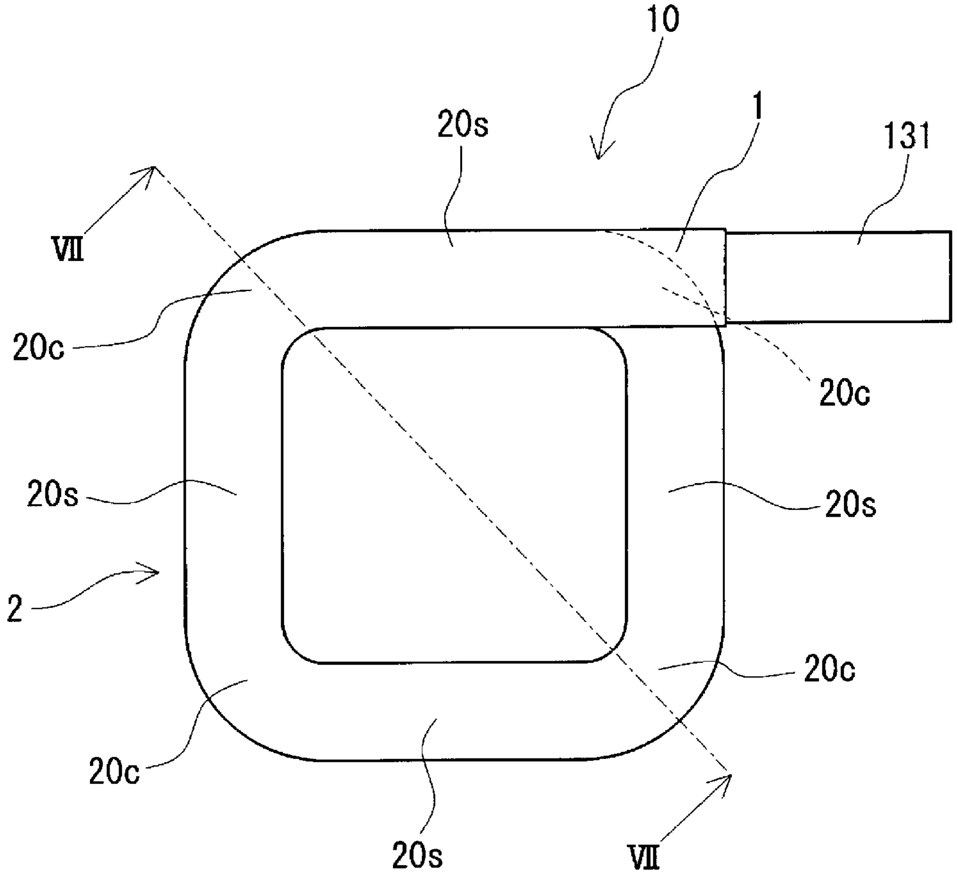
FIG. 6 is a schematic end view of a coil used in the reactor according to the present embodiment, when looking in the axial direction.

First, an overview of the coil 10 will be given mainly with reference to FIGS. 5 and 6. The coil 10 is an edgewise coil made of flat wire 1. As depicted in FIG. 5, the coil 10 is formed by a plurality of turns 2 produced by winding the flat wire 1 edgewise into a spiral. Both end portions of the coil 10 are provided with terminal portions 131 and 132 where the flat wire 1 extends outward. The terminal portion 131 extends out from the first end portion 121 of the coil 10. The terminal portion 132 extends out from the second end portion 122 of the coil 10. The first end portion 121 and the second end portion 122 are composed of the turns disposed at both sides of the coil 10. The terminal portions 131 and 132 are parts that protrude outward beyond the perimeter of the turns, which are produced by winding the flat wire 1 into a spiral. FIG. 5 depicts a state before the terminal portion 132 is bent flatwise in the axial direction of the coil 10, that is, before the shape of the coil 10 depicted in FIG. 1 is formed. FIG. 6 is a view of the coil 10 that appears in FIG. 5 when looking in the axial direction from the first end portion 121 side. In FIG. 6, the end portion 132 of the coil 10 has not been illustrated.

The coil 10 may be shaped as a round or polygonal cylinder. The expression "round cylinder" here means that the end faces of the coil 10 when looking in the axial direction are round. The expression "round" here also includes elliptical shapes in addition to perfect circles. The expression "polygonal cylinder" here means that the end faces are polygonal. Examples of polygonal shapes include triangular, quadrangular, hexagonal, and octagonal shapes. Quadrangular shapes include rectangular shapes and trapezoidal shapes, and rectangular shapes include a square shape. The coil 10 according to the present embodiment is shaped as a polygonal cylinder. In more detail, the coil 10 is a quadrangular cylindrical coil whose end faces are rectangular.

(Flat Wire)

The flat wire 1 is a wire that is rectangular in cross section. The cross section referred to here is a cross section taken perpendicular to the length direction of the flat wire 1. The rectangle has a pair of short sides and a pair of long sides, like the flat wire 1 depicted in FIG. 8. The "width" of the flat wire 1 is the distance between the short sides that face each other, and corresponds to the length of each long side. The width direction of the flat wire 1 is effectively the direction along the long sides of the rectangle. The "thickness" of the flat wire 1 is the distance between the long sides that face each other and corresponds to the length of the short sides. The thickness direction of the flat wire 1 is effectively the direction along the short sides of the rectangle. The width and thickness of the flat wire 1 can be selected as appropriate. As examples, the width of the flat wire 1 is 3 mm or more and 15 mm or less, or possibly 5 mm or more and 12 mm or less. As examples, the thickness of the flat wire 1 is 0.5 mm or more and 5 mm or less, or possibly 0.8 mm or more and 3 mm or less.

(Turns)

A plurality of turns 2 are formed by winding the flat wire 1 into a spiral. The shape of each turn 2 is substantially the same as the shape of the end faces of the coil 10 described above. The shape of the turns 2 referred to here is the shape of the turns 2 when looking in the axial direction. In the present embodiment, as depicted in FIG. 6, the turns 2 are rectangular in shape. Each turn 2 has four straight portions 20*s*, where the flat wire 1 is disposed in a straight line, and four corner portions 20*c* produced by bending the flat wire 1.

The number of turns 2 can be selected as appropriate. As examples, the number of turns 2 is 10 turns or more and 60 turns or less, or possibly 20 turns or more and 50 turns or less.

(First Coil Portion and Second Coil Portion)

Figure 7:
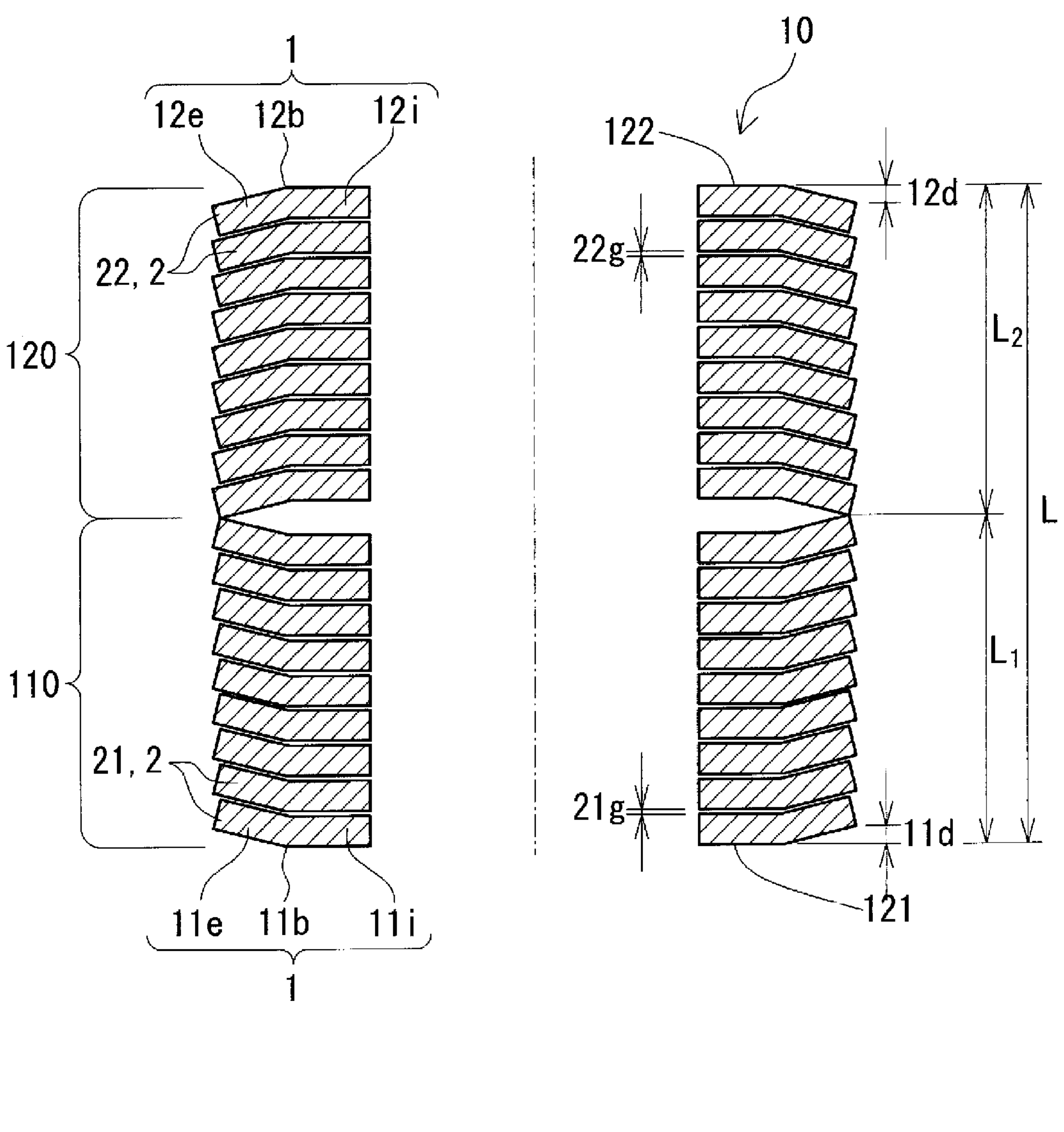
FIG. 7 is a cross-sectional view taken along a line VII-VII in FIG. 6.

The configuration of the coil 10 will now be described in detail with reference to FIG. 7. FIG. 7 depicts only a cross section taken along a line VII-VII indicated in FIG. 6. In FIG. 7, configurations located to the rear of the cut surfaces are omitted. The line VII-VII indicated in FIG. 6 is a diagonal line of the turns 2. The coil 10 includes the first coil portion 110 and the second coil portion 120. The first coil portion 110 includes a plurality of first turns 21 produced by winding the flat wire 1 edgewise into a spiral. The second coil portion 120 includes a plurality of second turns 22 produced by winding the flat wire 1 edgewise into a spiral. One feature of the coil 10 is that the flat wire 1 forming the first turns 21 and the second turns 22 has specific shapes.

The first coil portion 110 and the second coil portion 120 are coaxially disposed and are continuously connected in the axial direction of the coil 10. That is, the first coil portion 110 and the second coil portion 120 are electrically connected in series and are mechanically disposed so as to be aligned in the axial direction of the coil 10. The first coil portion 110 and the second coil portion 120 are formed of one continuous flat wire 1. The first coil portion 110 and the second coil portion 120 are seamlessly composed by a single string of flat wire 1. The axial direction of the first coil portion 110 and the axial direction of the second coil portion 120 match the axial direction of the coil 10.

(First Turns)

As depicted in FIG. 7, the first coil portion 110 is formed by a plurality of first turns 21. The number of first turns 21 can be selected as appropriate. Each of the plurality of first turns 21 includes a first inner peripheral portion 11*i* and a first outer peripheral portion 11*e*. The first inner peripheral portion 11*i* constructs the inner periphery side of a first turn 21 in the flat wire 1. The first outer peripheral portion 11*e* constructs the outer periphery side of a first turn 21 in the flat wire 1. The first outer peripheral portion 11*e* is bent with respect to the first inner peripheral portion 11*i* so as to be inclined toward a first direction in the axial direction of the coil 10. In more detail, the flat wire 1 forming each first turn 21 is bent midway in the width direction of the flat wire 1. The first inner peripheral portion 11*i* and the first outer peripheral portion 11*e* are connected via a bent portion 11*b*. The first inner peripheral portion 11*i* is a part of the flat wire 1 located closer to the inner periphery side of the first turn 21 than the bent portion 11*b*. The first outer peripheral portion 11*e* is a part of the flat wire 1 located closer to the outer periphery side of the first turn 21 than the bent portion 11*b*. In the present embodiment, the flat wire 1 in each first turn 21 is bent midway in the width direction at both the straight portions 20*s* and the corner portions 20*c* depicted in FIG. 6. Compared to the corner portions 20*c*, there tends to be less bending of the flat wire 1 at the straight portions 20*s*. The reason for this will be described in the description of a method for manufacturing a coil given later in this specification.

When looking at a cross section taken along the axial direction of the first coil 10, each first inner peripheral portion 11*i* extends substantially along the radial direction from the inner periphery side toward the outer periphery side of each first turn 21. That is, the first inner peripheral portion 11*i* extends substantially parallel to the radial direction of the first turn 21. Regarding deviation in the first inner peripheral portions 11*i* from the radial direction, which is caused by the winding pitch of the flat wire 1, the first inner peripheral portions 11*i* are regarded as being along the radial direction.

The "first direction" mentioned earlier is a direction from one end in the axial direction of the coil 10 toward the other end. Out of the two end portions of the coil 10, the end portion on the side where the first coil portion 110 is positioned is denoted as the "first end portion 121" and the end portion on the side where the second coil portion 120 is positioned is denoted as the "second end portion 122." In the present embodiment, the end portion of the coil 10 located at the bottom in FIG. 7 is the first end portion 121 and the end portion of the coil 10 located at the top is the second end portion 122. That is, the first direction is the direction from the first end portion 121 toward the second end portion 122. In FIG. 7, the first direction is the direction from the bottom toward the top. This means that the first outer peripheral portions 11*e* are upwardly inclined with respect to the first inner peripheral portion 11*i*.

As examples, the length of the first inner peripheral portion 11*i* in the width direction of the flat wire 1 is 30% or more and 75% or less, or possibly 40% or more and 70% or less, of the width of the flat wire 1. As examples, the length of the first outer peripheral portion 11*e* in the width direction of the flat wire 1 is 25% or more and 70% or less, or possibly 30% or more and 60% or less, of the width of the flat wire 1.

(First Displacement)

As examples, a first displacement 11*d* in the axial direction of the coil 10 between the first inner peripheral portion 11*i* and the first outer peripheral portion 11*e* is 0.1 mm or more and 1.0 mm or less, or possibly 0.2 mm or more and 0.6 mm or less. The first displacement 11*d* is the displacement at corner portions of the first turns 21. The displacement at the straight portions of each first turn 21 may be smaller than this displacement at the corner portions. The "corner portions" referred to here are the corner portions 20*c* appearing in FIG. 6. The "straight portions" referred to here are the straight portions 20*s* appearing in FIG. 6.

All of the first displacements 11*d* of the plurality of first turns 21 may be equal. Out of the plurality of first turns 21, the first displacement 11*d* in some of the first turns 21 may differ from the first displacement 11*d* in at least one of the other first turns 21. As one example, out of the plurality of first turns 21, a first turn 21 positioned on the second end 122 side may have a first displacement 11*d* that is larger than the first displacement 11*d* of the other first turns 21. This first turn 21 positioned on the second end portion 122 side faces the second turns 22 of the second coil portion 120.

The first displacement 11*d* can be measured as follows using a laser rangefinder for example. The coil 10 is placed on a horizontal table so that the axial direction of the coil 10 is vertical. The coil 10 is disposed so that the first end portion 121 is at the top and the second end portion 122 is at the bottom. The distance from a reference position at the top of the coil 10 to the intersection between the top surface and the side surface of the first inner peripheral portion 11*i* is measured. This distance is denoted as the "first distance." The side surface of the first inner peripheral portion 11*i* is the inner peripheral surface of the first turn 21 and is a surface that corresponds to one short side of the rectangle in a cross section of the flat wire 1. The distance from the reference position described above to the intersection between the top surface and the side surface of the first outer peripheral portion 11*e* is also measured. This distance is denoted as the "second distance." The side surface of the first outer peripheral portion 11*e* is the outer peripheral surface of the first turn 21 and is a surface that corresponds to the other short side of the rectangle in a cross section of the flat wire 1. The difference between the first distance and the second distance is defined as the "first displacement 11*d*." This first displacement 11*d* is measured at every corner portion 20*c* of the first turn 21. In the present embodiment, the first displacements 11*d* at the four corner portions 20*c* depicted in FIG. 6 are measured. The average value of the measured first displacements 11*d* at every corner portion is set as the first displacement 11*d* at the first turns 21.

(Second Turns)

As depicted in FIG. 7, the second coil portion 120 is formed by a plurality of second turns 22. The number of second turns 22 can be selected as appropriate. The number of second turns 22 may be the same as or different from the number of first turns 21 that form the first coil portion 110. Each of the plurality of second turns 22 includes a second inner peripheral portion 12*i* and a second outer peripheral portion 12*e*. The second inner peripheral portion 12*i* constructs the inner periphery side of a second turn 22 in the flat wire 1. The second outer peripheral portion 12*e* constructs the outer periphery side of a second turn 22 in the flat wire 1. The second outer peripheral portion 12*e* is bent with respect to the second inner peripheral portion 12*i* so as to be inclined toward a second direction in the axial direction of the first coil portion 110. In more detail, like the first turns 21 described earlier, the flat wire 1 forming each second turn 22 is bent midway in the width direction of the flat wire 1. The second inner peripheral portion 12*i* and the second outer peripheral portion 12*e* are connected via a bent portion 12*b*. The second inner peripheral portion 12*i* is a part of the flat wire 1 located closer to the inner periphery side of a second turn 22 than the bent portion 12*b*. The second outer peripheral portion 12*e* is a part of the flat wire 1 positioned closer to the outer periphery side of a second turn 22 than the bent portion 11*b*. In the present embodiment, the flat wire 1 in each second turn 22 is bent midway in the width direction at both the corner portions 20*c* and the straight portions 20*s* depicted in FIG. 6. Compared to the corner portions 20*c*, there tends to be less bending of the flat wire 1 at the straight portions 20*s*.

When looking at a cross section taken along the axial direction of the coil 10, each second inner peripheral portion 12*i* extends substantially along the radial direction from the inner periphery side toward the outer periphery side of each second turn 22. That is, the second inner peripheral portion 12*i* extends substantially parallel to the radial direction of a second turn 22. Regarding deviation in the second inner peripheral portions 12*i* from the radial direction, which is caused by the winding pitch of the flat wire 1, the second inner peripheral portions 12*i* are regarded as being along the radial direction.

The "second direction" given above is a direction from the other end in the axial direction of the coil 10 toward the one end mentioned earlier. That is, the second direction is opposite to the first direction described earlier. That is, the second direction is a direction directed from the second end portion 122 toward the first end portion 121. In FIG. 7, the second direction is the direction from the top toward the bottom. That is, the second outer peripheral portions 12*e* are downwardly inclined with respect to the second inner peripheral portions 12*i*.

As examples, the length of the second inner peripheral portion 12*i* in the width direction of the flat wire 1 is 30% or more and 75% or less, or possibly 40% or more and 70% or less, of the width of the flat wire 1. As examples, the length of the second outer peripheral portion 12*e* in the width direction of the flat wire 1 is 25% or more and 70% or less, or possibly 30% or more and 60% or less, of the width of the flat wire 1.

(Second Displacement)

As examples, a second displacement 12*d* in the axial direction of the second coil 10 between the second inner peripheral portion 12*i* and the second outer peripheral portion 12*e* may be 0.1 mm or more and 1.0 mm or less, or possibly 0.2 mm or more and 0.6 mm or less. The second displacement 12*d* is the displacement at corner portions of the second turns 22. The displacement at the straight portions of the second turns 22 may be smaller than the displacement at the corner portions. The "corner portions" referred to here are the corner portions 20*c* appearing in FIG. 6. The "straight portions" referred to here are the straight portions 20*s* appearing in FIG. 6.

All the second displacements 12*d* of the plurality of second turns 22 may be the same. Out of the plurality of second turns 22, the second displacement 12*d* in some of the second turns 22 may differ from the second displacement 12*d* in at least one of the remaining second turns 22. As one example, out of the plurality of second turns 22, the second turn 22 positioned on the first end 121 side may have a second displacement 12*d* that is larger than the second displacement 12*d* of the other second turns 22. This second turn 22 positioned on the first end portion 121 side faces the first turns 21 of the first coil portion 110.

The second displacement 12*d* may be measured in the same way as the first displacement 11*d* described above. Measurement of the second displacement 12*d* is performed with the coil 10 placed on a horizontal table so that the first end portion 121 faces upward. A first distance from a reference position at the top of the coil 10 to an intersection of the top surface and the side surface of the second inner peripheral portion 12*i* and a second distance to an intersection between the top surface and the side surface of the second outer peripheral portion 12*e* are measured. The difference between the first distance and the second distance is defined as the "second displacement 12*d*." The second displacement 12*d* is measured at every corner portion of the second turn 22, and the average value is set as the second displacement 12*d* of the second turn 22.

(Space)

As depicted in FIGS. 3 and 4, the coil 10 has a space 15 formed between the first coil portion 110 and the second coil portion 120. A temperature sensor 50 is disposed in this space 15. As described earlier with reference to FIG. 7, in the first turns 21 that form the first coil portion 110, the first outer peripheral portion 11*e* is bent with respect to the first inner peripheral portion 11*i* so as to be inclined in the first direction. In the second turns 22 that form the second coil portion 120, the second outer peripheral portion 12*e* is bent with respect to the second inner peripheral portion 12*i* so as to be inclined in the second direction. By bending the first turns 21 and the second turns 22 in opposite directions, the first turn 21 and the second turn 22 that face each other become distanced from each other. This results in the space 15 being formed between the first coil portion 110 and the second coil portion 120. In the present embodiment, as described above, the flat wire 1 is bent midway in the width direction at each corner portion 20*c* of the first turns 21 and the second turns 22. This means that the space 15 is formed between the straight portions 20*s* of the first turn 21 and the second turn 22.

As examples, the size of the space 15 is 0.2 mm or more and 2.0 mm or less. By making the space 15 0.2 mm or more in size, it is easy to use the space 15 as a space that houses the temperature sensor 50. When the size of the space 15 is 0.5 mm or more, it is even easier to use the space 15 as a space that houses the temperature sensor 50. Since the size of the space 15 is 2.0 mm or less, it is possible to reduce the exposure of an inner core portion 30*i*, which is disposed inside the coil 10, from the space 15. When the size of the space 15 is 1.0 mm or less, the exposed part of the inner core portion 30*i* can be further reduced. The size of the space 15 may be 0.4 mm or more and 1.2 mm or less, or possibly 0.5 mm or more and 1.0 mm or less. The expression "size" of the space 15 is the distance (gap) between the first turn 21 and the second turn 22 that face each other. The size of the space 15 is the size along the axial direction of the coil 10 and is set as the maximum value of the gap between the first turns 21 and the second turns 22 that face each other.

The size of the space 15 is determined by the first displacement 11*d* of the first turns 21 and the second displacement 12*d* of the second turns 22 described above. The larger the first displacement 11*d* and the second displacement 12*d*, the larger the size of the space 15. Since the first displacement 11*d* and the second displacement 12*d* are 0.1 mm or more, it is easy to obtain the space 15 in which the temperature sensor 50 can be disposed. In particular, when the total of the first displacement 11*d* and the second displacement 12*d* for the first turn 21 and the second turn 22 that face each other is 0.4 mm or more and 1.2 mm or less, or possibly 0.5 mm or more and 1.0 mm or less, it becomes easier to provide a sufficient space 15. From the viewpoint of manufacturing the coil 10, the upper limit of the first displacement 11*d* and the second displacement 12*d* is 1.0 mm for example. When the first displacement 11*d* and the second displacement 12*d* are 1.0 mm or less, it is difficult to grasp at first glance that the flat wire 1 is bent midway in the width direction. That is, it is easy to obtain a coil with a favorable appearance that is comparable to a conventional coil.

In the present embodiment, the gap portion 30*g* is provided in the inner core portion 30*i*. The space 15 is located to the outside of this gap portion 30*g*. This means the temperature sensor 50 is provided to the outside of the gap portion 30*g*.

(Gaps Between Turns)

In addition, as depicted in FIG. 7, in the first coil portion 110, the flat wire 1 forming the first turns 21 is bent midway in the width direction, which makes it possible to reduce the gaps 21*g* between the first turns 21. In the second coil portion 120, the flat wire 1 forming the second turns 22 is bent midway in the width direction, which makes it possible to reduce the gaps 22*g* between the second turns 22. The reason why the gaps 21*g* and the gaps 22*g* are reduced is not clear, but is believed to be as follows. Since the flat wire 1 is bent midway in the width direction, a pulling force acts upon each of the first turns 21 and the second turns 22 in the direction in which the flat wire 1 is bent, which is assumed to make the gaps between the first turns 21 and the gaps between the second turns 22 narrower. When the first displacement 11*d* of the first turns 21 and the second displacement 12*d* of the second turns 22 are 0.1 mm or more, this effect of reducing the gaps 21*g* and the gaps 22*g* is more likely to be obtained.

As examples, the gaps 21*g* and the gaps 22*g* are 0.076 mm or less, or possibly 0.06 mm or less or 0.05 mm or less. A lower limit is not set because the smaller the gaps 21*g* and the gaps 22*g*, the shorter the total length L of the coil 10. That is, the lower limit is zero.

The gaps 21*g* between the first turns 21 can be calculated as an average value of all the gaps 21*g*. The gaps 21*g* are calculated as $[(L_1-n_1\times t)/(n_1-1)]$. Here, $L_1$ is the length (in mm) of the first coil portion 110, $n_1$ is the number of turns (turns) for the first turns 21, and t is the thickness (in mm) of the flat wire 1.

The length $L_1$ of the first coil portion 110 is measured as follows. A straight line parallel to the axial direction of the coil 10 is drawn at a freely chosen position in the circumferential direction on the outer peripheral surface of the first coil portion 110. This straight line is an imaginary straight line that contacts the outer peripheral surfaces of the first turns 21. The linear distance between the first turns 21 positioned at both ends, out of the first turns 21 on this straight line, is thereby obtained. This distance is denoted as the "length $L_1$." The length $L_1$ of the first coil portion 110 may be measured by placing the coil 10 on a horizontal table so that the axial direction of the coil 10 is horizontal. Measurement is performed in a state where no load is applied to the coil 10. The number of turns $n_1$ for the first turns 21 is the number of first turns 21 that intersect this straight line. The value $(n_1-1)$ represents the number of gaps 21*g* between the first turns 21.

The gaps 22*g* between the second turns 22 may be measured in the same way as the gaps 21*g* between the first turns 21 described above. The gaps 22*g* are calculated as $[(L_2-n_2\times t)/(n_2-1)]$. Here, "$L_2$" is the length (in mm) of the second coil portion 120. "n2" is the number of turns for the second turns 22.

In the same way as the length $L_1$ of the first coil portion 110 described above, the length $L_2$ of the second coil portion 120 may be calculated using an imaginary straight line that has been drawn parallel to the axial direction of the coil 10 on the outer peripheral surface of the second coil portion 120. The number of turns $n_2$ of the second turns 22 is the number of second turns 22 that intersect this straight line. The value $(n_2-1)$ represents the number of gaps 22*g* between the second turns 22. The total length L of the coil 10 is the sum of the length $L_1$ of the first coil portion 110 and the length $L_2$ of the second coil portion 120.

(Temperature Sensor)

As depicted in FIGS. 3 and 4, the temperature sensor 50 is disposed in the space 15 formed between the first coil portion 110 and the second coil portion 120. The temperature sensor 50 measures the temperature of the coil 10. As examples, a thermistor, a thermocouple, a measuring resistor, or the like can be used as the temperature sensor 50. The thickness of the temperature sensor 50 is smaller than the size of the space 15. In FIG. 4, the cross-sectional shapes of the first turns 21 and the second turns 22 have been simplified out of convenience in order to describe the positional relationship between the temperature sensor 50 and the gap portion 30*g*. In reality, the respective outer peripheral portions of the first turns 21 and the second turns 22 are bent so that the outer peripheral portions approach each other, as depicted in FIG. 7.

There are no particular limitations on the location where the temperature sensor 50 is disposed. In the present embodiment, the temperature sensor 50 is disposed on the upper surface side of the coil 10. However, when the temperature sensor 50 is provided on the opposite side to the installation surface of the reactor 100, it is easy to measure the temperature of the coil 10 accurately. The reactor 100 is normally installed on a cooling plate that has coolant flowing through it. In the present embodiment, the lower surface of the reactor 100 is the installation surface to be placed on the cooling plate. With this configuration, the lower surface side of the coil 10 is likely to dissipate heat toward the cooling plate. By providing the temperature sensor 50 on the upper surface side of the coil 10 at a distance from the lower surface, which is the installation surface, the temperature of the hottest part of the coil 10 can be measured accurately.

By disposing the temperature sensor 50 in the space 15, the temperature of the coil 10 can be measured with high accuracy. The temperature of the coil 10 tends to rise more on the inner peripheral surface side of the coil 10 than at the outer peripheral surface of the coil 10. This is because it is difficult for heat to escape from the inner periphery side of the coil 10 where the magnetic core 30 is disposed. Heat generated at the magnetic core 30 is also transferred to the coil 10. When the temperature sensor 50 is disposed in the space 15, it is possible to measure the temperature of a part that is most likely to become hot, that is, a part close to the inner peripheral surface side of the coil 10.

The temperature sensor 50 may be fixed to either one of the first turn 21 and the second turn 22 that face each other. In the present embodiment, the temperature sensor 50 is fixed to the first turn 21 using a fixing material 70. By fixing the temperature sensor 50 to one of the first turn 21 and the second turn 22, the temperature of the coil 10 can be measured more accurately. As examples, the fixing material 70 is adhesive, adhesive tape, or solder.

In addition, as depicted in FIG. 4, the temperature sensor 50 may be positioned on the inner periphery side of the coil 10. In more detail, the temperature sensor 50 may be positioned at one of the first inner peripheral portion 11*i* and the second inner peripheral portion 12*i* of a first turn 21 and a second turn 22 depicted in FIG. 7. In the present embodiment, the temperature sensor 50 is positioned on the inner periphery side of a first turn 21, that is, on a first inner peripheral portion 11*i*. As described above, the temperature rise is large at the inner periphery side of the coil 10. By positioning the temperature sensor 50 on the inner periphery side of the coil 10, the temperature of the coil 10 can be measured more accurately.

In the present embodiment, the space 15 is positioned to the outside of the gap portion 30*g* provided in the inner core portion 30*i*. This means that the temperature sensor 50 is provided to the outside of the gap portion 30*g*. Leakage magnetic flux occurs at the gap portion 30*g*. Since eddy current loss occurs in the coil 10 due to leakage magnetic flux in the vicinity of the gap portion 30*g*, the temperature of the coil 10 is likely to rise. Since the temperature sensor 50 is provided to the outside of the gap portion 30*g*, it is possible to measure the temperature of the coil 10 in the vicinity of the gap portion 30*g* where the temperature is the highest. This means that the temperature of the coil 10 can be measured more accurately.

The temperature sensor 50 can be attached to the coil 10 via a fixing material 70, for example.

(Magnetic Core)

The configuration of the magnetic core 30 will now be described with reference to FIGS. 1 and 2. The magnetic core 30 is a combination of a first core 31 and a second core 32. The first core 31 and the second core 32 will be described later. The magnetic core 30 includes a middle core portion 300, a first end core portion 310, a second end core portion 320, a first side core portion 330, and a second side core portion 340.

(Middle Core Portion)

The middle core portion 300 is the part of the magnetic core 30 that is disposed inside the coil 10. That is, the middle core portion 300 corresponds to the inner core portion 30*i*. In the present embodiment, the middle core portion 300 is divided into two parts in the length direction of the middle core portion 300 and includes a first middle core portion 301 and a second middle core portion 302. The gap portion 30*g* may be provided midway in the length direction of the middle core portion 300. This gap portion 30*g* is provided between the first middle core portion 301 and the second middle core portion 302. The gap portion 30*g* may be an air gap or may be a member of a non-magnetic material, such as resin or ceramic. The gap portion 30*g* does not need to be provided.

(First End Core Portion and Second End Core Portion)

The first end core portion 310 is a part of the magnetic core 30 that faces the first end portion 121 of the coil 10. The second end core portion 320 is a part that faces the second end portion 122 of the coil 10. The first end core portion 310 and the second end core portion 320 are disposed at an interval so as to sandwich the coil 10 from the axial direction.

(First Side Core Portion and Second Side Core Portion)

The first side core portion 330 and the second side core portion 340 are parts of the magnetic core 30 that are disposed outside the coil 10 so as to sandwich the middle core portion 300. The first side core portion 330 and the second side core portion 340 are disposed at an interval so as to sandwich both side surfaces along the axial direction of the coil 10. The first side core portion 330 and the second side core portion 340 are sufficiently long to connect the first end core portion 310 and the second end core portion 320.

(First Core and Second Core)

The magnetic core 30 is constructed by a combination of the first core 31 and the second core 32. The respective shapes of the first core 31 and the second core 32 can be selected from various combinations. The magnetic core 30 in the present embodiment is an E-T type where an E-shaped first core 31 and a T-shaped second core 32 are combined. Other example combinations include an E-U type, an E-I type, and a T-U type.

In the present embodiment, the first core 31 includes the first end core portion 310, a first middle core portion 301 that is part of the middle core portion 300, and the entire first side core portion 330 and second side core portion 340. The first end core portion 310, the first middle core portion 301, the first side core portion 330, and the second side core portion 340 are integrally formed. The second core 32 includes the second end core portion 320 and a second middle core portion 302 that is the remaining part of the middle core portion 300. The second end core portion 320 and the second middle core portion 302 are integrally formed.

As examples, the magnetic core 30 is composed of a molding of powder-compacted material or a molding of composite material. A molding of powder-compacted material is produced by compression-molding a powder made of a soft magnetic material. Soft magnetic materials include metals such as iron and iron alloy and non-metals such as ferrite. Examples of iron alloy include Fe—Si alloy and Fe—Ni alloy. A powder made of a soft magnetic material is referred to hereinafter as "soft magnetic powder." As examples, the content of the soft magnetic powder in a molding of powder-compacted material is 85% by volume or more and 99.99% by volume or less, where the powder-compacted molding itself is regarded as 100% of the volume.

A molding of composite material is made by dispersing soft magnetic powder in resin. A molding of composite material is obtained by filling a mold with a raw material, in which soft magnetic powder has been mixed and dispersed in uncured resin, and then curing the resin. As examples, the content of the soft magnetic powder in the composite material is 20% by volume or more and 80% by volume or less, where the composite material itself is regarded as 100% of the volume. As examples, the resin in the composite material is a thermosetting resin or a thermoplastic resin. Examples of thermosetting resins include epoxy resin, phenol resin, silicone resin, and urethane resin. Examples of thermoplastic resin include polyphenylene sulfide resin, polyamide resin, polyimide resin, liquid crystal polymer, and fluorine resin. In general, a molding of composite material will contain a larger amount of resin than a molding of powder-compact material, and therefore have lower thermal conductivity than a powder-compacted material. A core piece made of a molding of composite material is hereinafter referred to as a "resin core piece."

The material constructing the first core 31 and the material constructing the second core 32 may be the same or may be different. As examples, the first core 31 and the second core 32 may be moldings of powder-compacted material, or the first core 31 and the second core 32 may be composed of resin core pieces. Alternatively, one of the first core 31 and the second core 32 may be composed of a molding of powder-compacted material, and the other may be composed of a resin core piece. In the present embodiment, the first core 31 is a resin core piece composed of a molding of composite material, and the second core 32 is a molding of powder-compacted material. That is, out of the middle core portion 300, the first middle core portion 301 is composed of a resin core piece, and the second middle core portion 302 is composed of a molding of powder-compacted material.

(Holding Members)

The present embodiment further includes two holding members 41 and 42. The holding member 41 is disposed on the first end portion 121 side of the coil 10. The holding member 42 is disposed on the second end portion 122 side of the coil 10. The holding members 41 and 42 ensure that the coil 10 is electrically insulated from the first end core portion 310 and the second end core portion 320 of the magnetic core 30. The holding members 41 and 42 are formed with through holes 43 into which the respective end portions of the middle core portion 300 are inserted.

The holding members 41 and 42 are shaped as rectangular frames. The holding member 41 contacts a turn that constructs the first end portion 121. The terminal portion 131 is drawn out from the holding member 41 in a direction that is perpendicular to the axial direction of the coil 10. The holding member 42 contacts a turn that constructs the second end portion 122. The holding member 42 has a slit through which the terminal portion 132 passes through. The terminal portion 132 passes through this slit and is drawn out in the axial direction of the coil 10.

(Method for Manufacturing a Coil)

A method for manufacturing the coil 10 described above will now be described mainly with reference to FIGS. 8 to 12. The coil 10 can be manufactured using a winding machine. A conventionally known winding machine can be used as this winding machine.

(Winding Machine)

Figure 8:
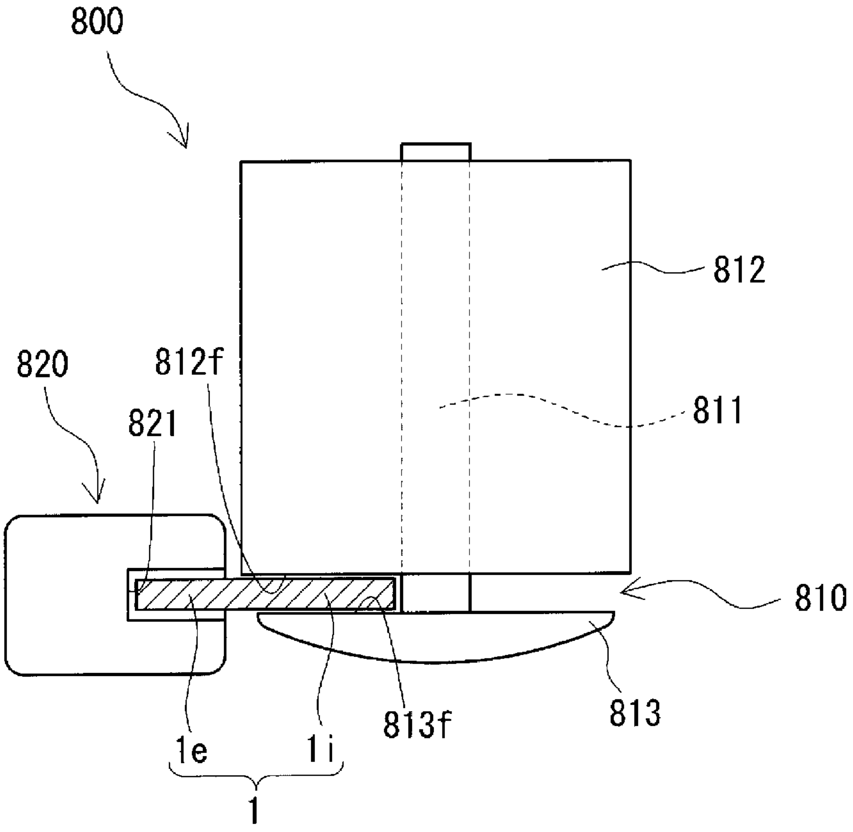
FIG. 8 is a schematic diagram for describing the configuration of a bending unit in a winding machine used to manufacture the coil used in the reactor according to the present embodiment.

The winding machine includes a bending unit 800 depicted in FIG. 8 and a feeding mechanism (not illustrated). The bending unit 800 performs edgewise bending of the flat wire 1. The feeding mechanism feeds out the flat wire 1. The bending unit 800 is a principal part of the winding machine.

(Bending Unit)

Figure 9:
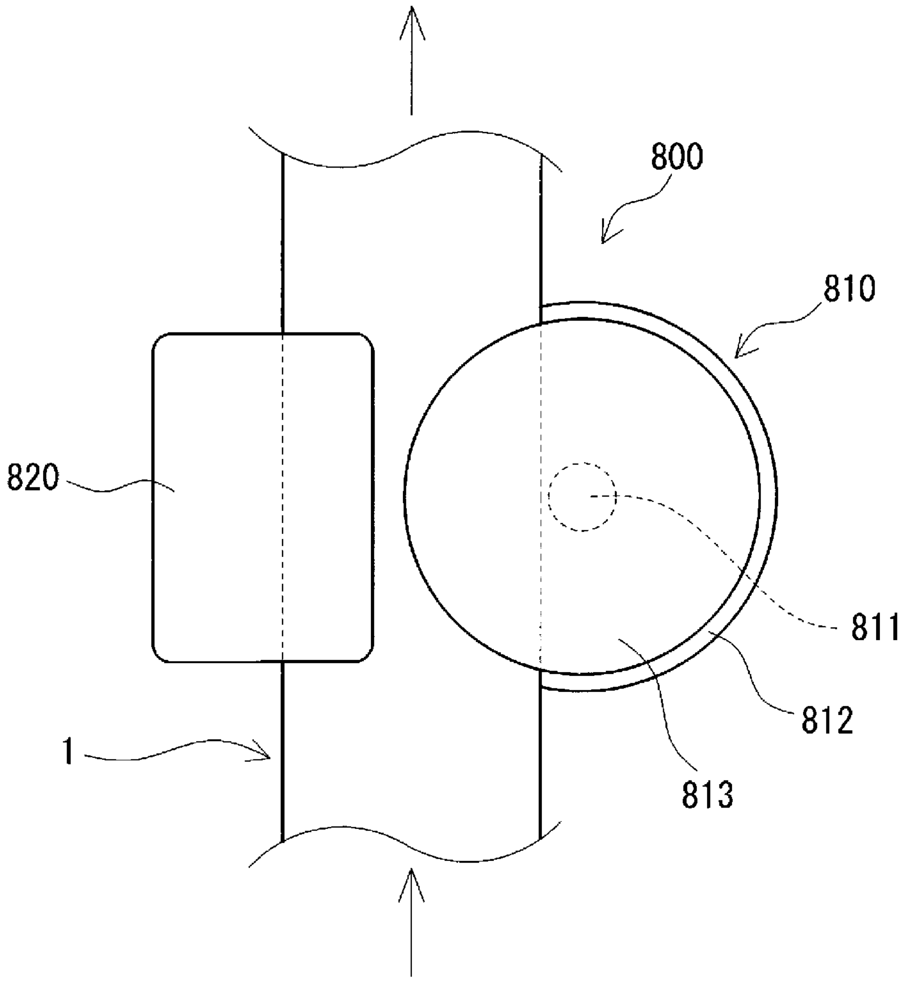
FIG. 9 is a schematic diagram for describing the operation of the bending unit.

As depicted in FIGS. 8 and 9, the bending unit 800 includes a holding unit 810 and a guiding unit 820. The holding unit 810 holds the inner peripheral portion 1*i* of the flat wire 1. The inner peripheral portion 1*i* of the flat wire 1 is a part located on the inner periphery side of the bend in the flat wire 1 when edgewise bending is performed on the flat wire 1. The guiding unit 820 holds the outer peripheral portion 1*e* of the flat wire 1. The outer peripheral portion 1*e* of the flat wire 1 is a part of the flat wire 1 located on the outer periphery side of the bend.

(Holding Unit)

The holding unit 810 includes a shaft 811 and a support 812 that supports the shaft 811. The shaft 811 is a cylindrical member that contacts a side surface of the inner peripheral portion 1*i* of the flat wire 1. The side surface of the inner peripheral portion 1*i* is a surface that corresponds to one short side of the rectangle in a cross section of the flat wire 1. The support 812 is tubular. The shaft 811 passes through the center of the support 812. The shaft 811 is slidable with respect to the support 812 in the axial direction of the shaft 811. The front end of the shaft 811 protrudes from an end surface of the support 812. A disc-shaped flange 813 is provided at the front end of the shaft 811. The support 812 and the flange 813 are disposed at a distance from each other.

The holding unit 810 includes a first surface 812*f* composed of an end surface of the support 812 and a second surface 813*f* composed of a surface of the flange 813 that faces the support 812. The first surface 812*f* and the second surface 813*f* are disposed facing each other so as to sandwich the inner peripheral portion 1*i* of the flat wire 1 in the thickness direction. The inner peripheral portion 1*i* of the flat wire 1 passes between the first surface 812*f* and the second surface 813*f* and is held. Slight clearance is provided between the first surface 812*f* and the inner peripheral portion 1*i* and between the second surface 813*f* and the inner peripheral portion 1*i* so that the flat wire 1 can pass through when the flat wire 1 is fed out.

(Guiding Unit)

The guiding unit 820 is rotatable around a central axis of the shaft 811. A guide groove 821 is formed in the guiding unit 820 so as to sandwich the inner peripheral portion 1*i* of the flat wire 1 in the thickness direction. The outer peripheral portion 1*e* of the flat wire 1 passes through the guide groove 821 and is held. The width of the guide groove 821 is slightly larger than the thickness of the outer peripheral portion 1*e* of the flat wire 1 to allow the flat wire 1 to pass through when the flat wire 1 is fed out.

In the present embodiment, the guiding unit 820 is capable of sliding with respect to the holding unit 810 in the axial direction of the shaft 811. The position of the guiding unit 820 is controlled for example by a driving apparatus (not illustrated). As one example, this driving apparatus is a servo motor.

Figure 10:
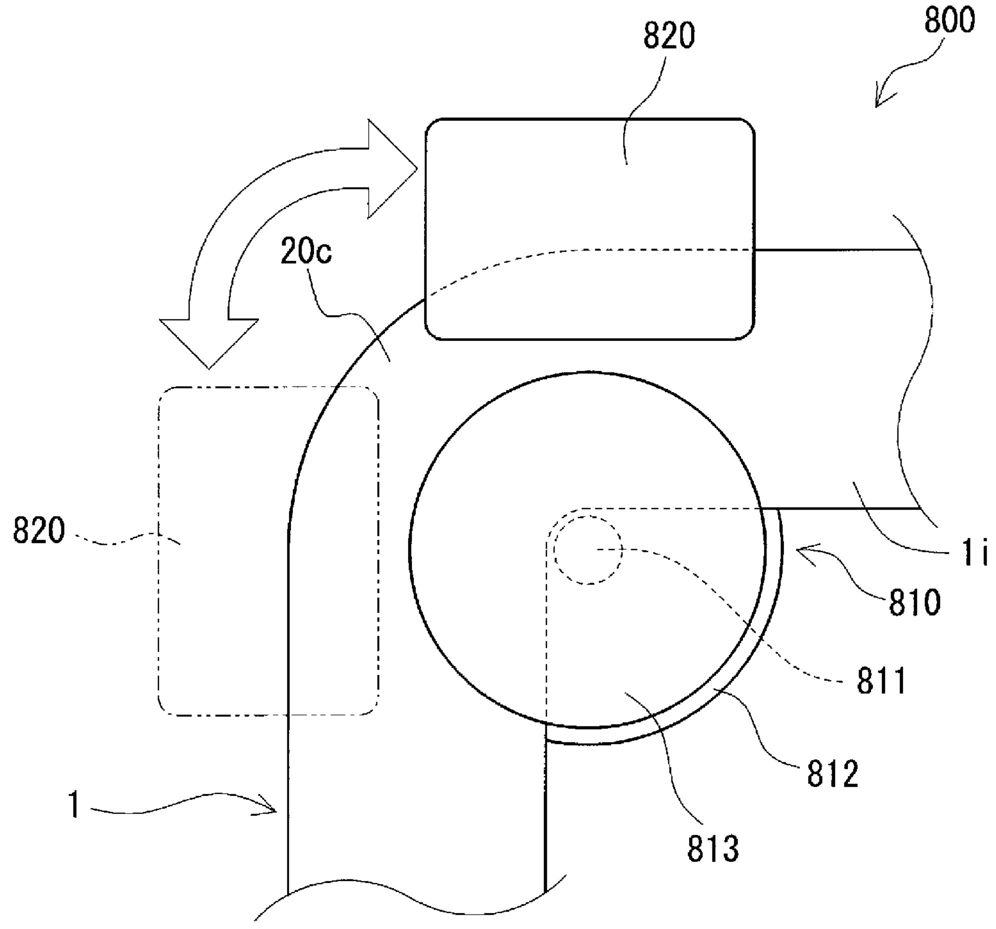
FIG. 10 is another schematic diagram for describing the operation of the bending unit.

The operation of the bending unit 800 during edgewise bending of the flat wire 1 will now be described with reference to FIGS. 9 and 10. The case when the quadrangular cylindrical coil 10 depicted in FIGS. 5 and 6 is formed will be described here as an example. FIGS. 9 and 10 are views of the bending unit 800 in the axial direction of the shaft 811 from the flange 813 side, that is, from below in FIG. 8. As depicted in FIG. 9, the flat wire 1 is linearly fed out by a feeding mechanism, not illustrated. The arrows in FIG. 9 indicate the feeding direction of the flat wire 1. Next, as depicted in FIG. 10, the guiding unit 820 is rotated around the center axis of the shaft 811. The side surface of the inner peripheral portion 1*i* is pressed against the outer peripheral surface of the shaft 811, which bends the flat wire 1 around the outer peripheral surface of the shaft 811. By doing so, the flat wire 1 is bent edgewise to form one corner portion 20*c*. In the present embodiment, the flat wire 1 is bent by 90 degrees by rotating the guiding unit 820 by 90 degrees. By repeating this operation, one turn 2 is formed. A rectangular turn 2 is formed by repeating the feeding out and edgewise bending of the flat wire 1 four times. The coil 10 is formed by forming a plurality of turns 2 by repeatedly forming a single turn 2 a plurality of times.

During feeding of the flat wire 1, as depicted in FIG. 8, the support 812 and the flange 813 are held at a distance so that gaps are formed between them and the inner peripheral portion 1*i* of the flat wire 1. During edgewise bending of the flat wire 1, the gap between the support 812 and the flange 813 is closed so that the inner peripheral portion 1*i* of the flat wire 1 becomes vertically sandwiched. During edgewise bending of the flat wire 1, the inner periphery side of the bend deforms so as to swell in the thickness direction, which makes the inner peripheral portion 1*i* thicker. However, by sandwiching the inner peripheral portion 1*i* of the flat wire 1 between the support 812 and the flange 813 in the thickness direction of the flat wire 1, it is possible to prevent the inner peripheral portion 1*i* of the flat wire 1 from becoming thicker during the edgewise bending.

Normally when a coil is produced using a winding machine, the positional relationship between the holding unit 810 and the guiding unit 820 is set so that the position where the inner peripheral portion 1*i* of the flat wire 1 is held and the position where the outer peripheral portion 1*e* of the flat wire 1 is held substantially match in the axial direction of the shaft 811 as depicted in FIG. 8. That is, the guiding unit 820 is positioned with respect to the holding unit 810 so that the inner peripheral portion 1*i* and the outer peripheral portion 1*e* of the flat wire 1 are flat. The position of the guide portion 820 at this time is set as a reference position of the guide portion 820. The expression "reference position" refers to a position where a center line between the first surface 812*f* and the second surface 813*f* when the holding unit 810 holds the inner peripheral portion 1*i* of the flat wire 1 and a center line in the width of the guide groove 821 of the guiding unit 820 are aligned.

The method for manufacturing the coil 10 described above will now be described in detail with reference to FIGS. 11 and 12. This method for manufacturing the coil 10 uses a winding machine equipped with the bending unit 800 described above. The method of manufacturing the coil 10 includes a step of forming the first turns and a step of forming the second turns. Each of these steps will be described in detail below. The following description may refer to FIG. 7. In the present embodiment, the winding starts from the first end portion 121 side of the coil 10.

(Step of Forming First Turns)

Figure 11:
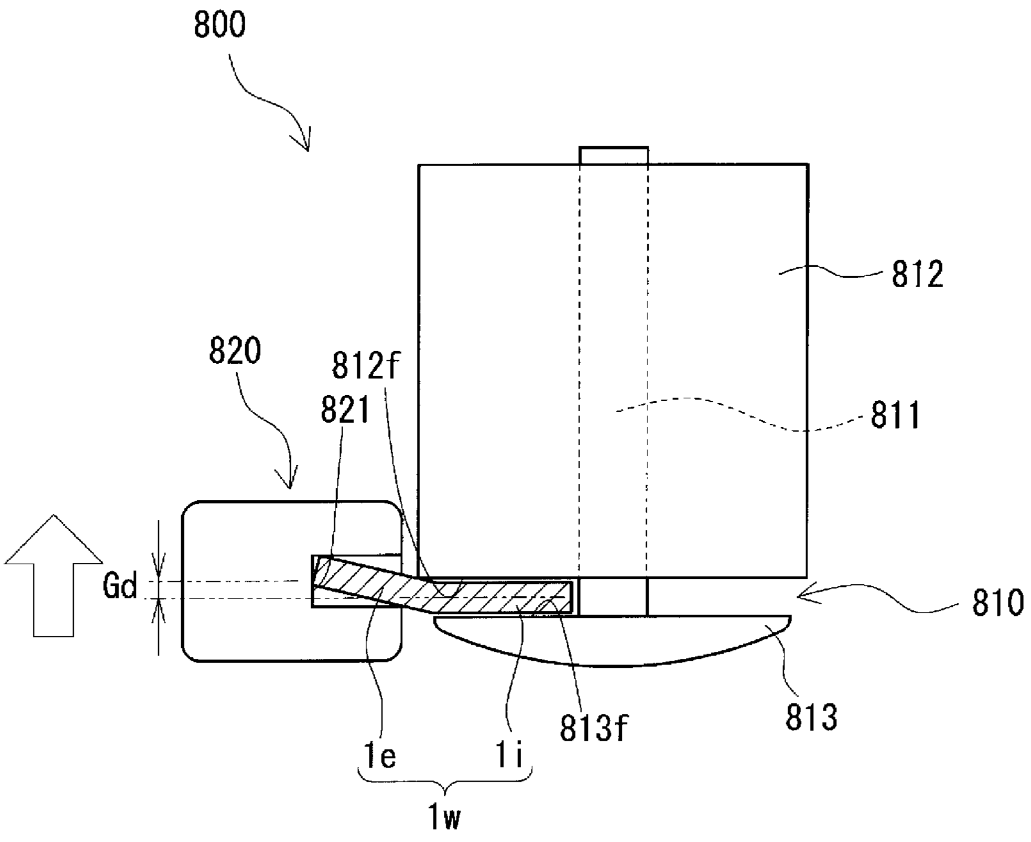
FIG. 11 is a schematic diagram for describing a method for manufacturing a coil.

As depicted in FIG. 11, the step of forming the first turns 21 is performed in a state where the guiding unit 820 is displaced with respect to the holding unit 810 in the first direction in the axial direction of the shaft 811. In more detail, by sliding the guiding unit 820 upward with the holding unit 810 as a reference, the guiding unit 820 becomes upwardly displaced with respect to the holding unit 810. That is, the first direction is the direction from the bottom toward the top in FIG. 11. By upwardly displacing the guiding unit 820 with respect to the holding unit 810 in this way, the flat wire 1 is bent so that the outer peripheral portion 1*e* of the flat wire 1 is upwardly inclined with respect to the inner peripheral portion 1*i*. By forming the first turns 21 in this state, as depicted in FIG. 7, first turns 21 where the first outer peripheral portion 11*e* is upwardly inclined with respect to the first inner peripheral portion 11*i* can be formed. By forming a predetermined number of these first turns 21, the first coil portion 110 is formed.

(Step of Forming Second Turns)

Figure 12:
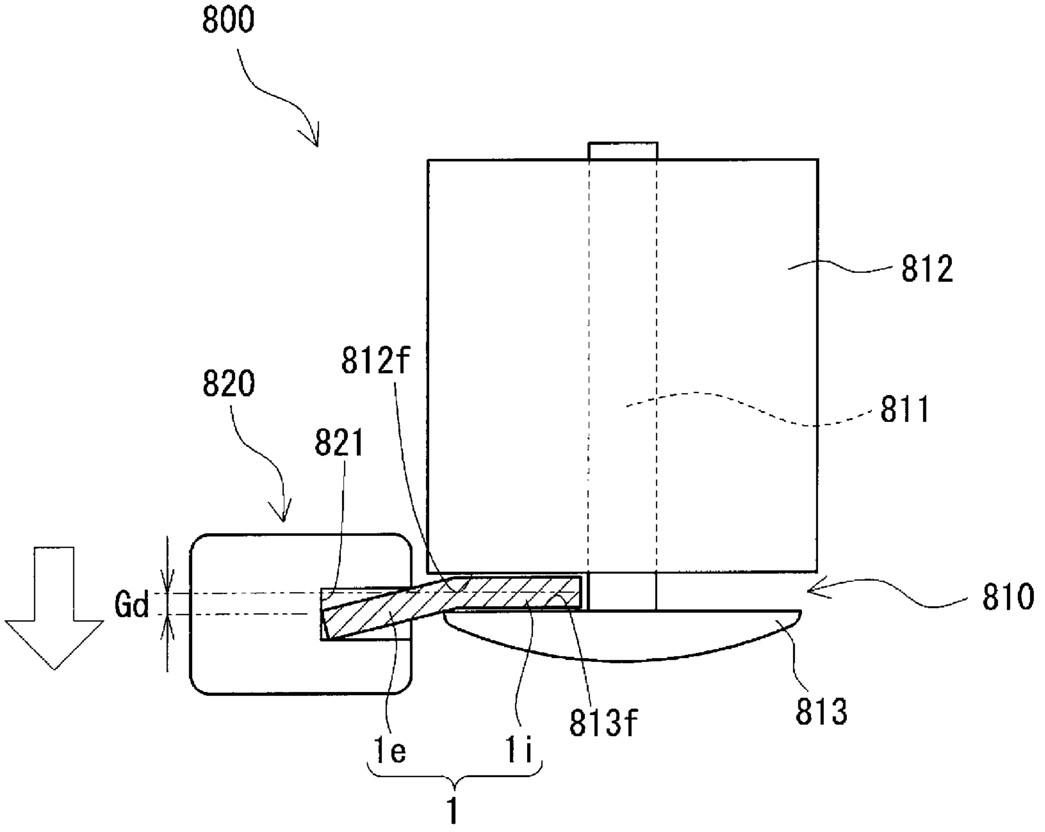
FIG. 12 is another schematic diagram for describing a method for manufacturing a coil.

The step of forming the second turns 22 is performed as depicted in FIG. 12 with the guiding unit 820 displaced relative to the holding unit 810 in the second direction in the axial direction of the shaft 811. This second direction is opposite to the first direction in the step of forming the first turns 21 described above. In more detail, by sliding the guiding unit 820 downward with respect to the holding unit 810, the guiding unit 820 becomes downwardly displaced with respect to the holding unit 810. That is, the second direction is the direction from the top toward the bottom in FIG. 12. By downwardly displacing the guiding unit 820 with respect to the holding unit 810 in this way, the rectangular wire 1 is bent so that the outer peripheral portion 1*e* of the flat wire 1 is downwardly inclined with respect to the inner peripheral portion 1*i*. By forming a second turn 22 in this state, as depicted in FIG. 7, second turns 22 can be formed where the second outer peripheral portion 12*e* is downwardly inclined with respect to the second inner peripheral portion 12*i*. By forming a predetermined number of these second turns 22, the second coil portion 120 is formed.

By performing the second turn forming step so as to continuously follow the first turn forming step, it is possible to manufacture the coil 10 in which the first coil portion 110 and the second coil portion 120 are continuously connected in the axial direction of the coil 10. When the flat wire 1 is bent midway in the width direction by displacing the guiding unit 820 with respect to the holding portion 810, it is possible to reduce the gaps between the first turns 21 and the gaps between the second turns 22.

In both the first turn forming step and the second turn forming step, the guiding unit 820 is maintained in the displaced state while the first turns 21 and the second turns 22 are being formed. That is, the positional relationship between the holding unit 810 and the guiding unit 820 is maintained. Since the inner peripheral portion 1*i* of the flat wire 1 is sandwiched between the support 812 and the flange 813 during edgewise bending, the flat wire 1 is bent at the corner portions of each turn. On the other hand, when the flat wire 1 is fed out, the support 812 and the flange 813 are held at a distance so that gaps are formed between these components and the inner peripheral portion 1*i* of the flat wire 1. This means that at the straight portions of a turn, it is difficult to apply a bending force to the flat wire 1 compared to at the corner portions. It is believed that this can result in reduced bending of the flat wire 1.

As examples, the displacement Gd of the guiding unit 820 with respect to the holding unit 810 may be 0.1 mm or more and 1.0 mm or less, or possibly 0.2 mm or more and 0.6 mm or less. The displacement Gd of the guiding unit 820 is the distance by which the guiding unit 820 is slid in the axial direction of the shaft 811 from the reference position described earlier. In the step of forming the first turns, the displacement Gd is a displacement in the first direction, or in other words, upward. In the step of forming the second turns, the displacement Gd is a displacement in the second direction, or in other words, downward.

As examples, the width of the inner peripheral portion 1*i* of the flat wire 1 held by the holding unit 810 is 30% or more and 75% or less, and possibly 40% or more and 70% or less, of the width of the flat wire 1. As examples, the width of the outer peripheral portion 1*e* of the flat wire 1 held by the guiding unit 820 is 25% or more and 70% or less, and possibly 30% or more and 60% or less, of the width of the flat wire 1.

The reactor 100 according to the present embodiment described above can be miniaturized. The temperature sensor 50 is disposed in the space 15 formed between the first coil portion 110 and the second coil portion 120. Since the temperature sensor 50 is provided inside the outer peripheral surface of the coil 10, an increase in the size of the reactor 100 can be avoided. The reactor 100 can accurately measure the temperature of the coil 10. The temperature rise is large at the inner periphery side of the coil 10. By disposing the temperature sensor 50 in the space 15, the temperature of a part near the inner peripheral surface side of the coil 10 can be measured. By measuring the temperature of the inner periphery side of the coil 10, which tends to be the hottest, the temperature of the coil 10 can be accurately measured.

Since the temperature of the coil 10 can be accurately measured, when current control of the coil 10 is performed based on the temperature of the coil 10, the responsiveness to changes of temperature in the coil 10 is improved.

The coil 10 makes it easy to provide the space 15 for disposing the temperature sensor 50 between the first coil portion 110 and the second coil portion 120. In the first turns 21 that construct the first coil portion 110 and the second turns 22 that construct the second coil portion 120, the flat wire 1 is bent midway in the width direction. Since the flat wire 1 is bent in opposite directions in the first turns 21 and the second turns 22, the space 15 where it is possible to dispose the temperature sensor 50 can be formed between the first coil portion 110 and the second coil portion 120.

Modifications

As described with reference to FIG. 4, in the above embodiment, a configuration where the space 15 is positioned outside to the gap portion 30*g* of the inner core portion 30*i* has been described. When the inner core portion 30*i* includes a resin core piece, the space 15 may be positioned to the outside of this resin core piece. In this case, the temperature sensor 50 is provided outside the resin core piece. In FIG. 4, if the first middle core portion 301 of the middle core portion 300, which is the inner core portion 30*i*, is a resin core piece, the space 15 will be positioned outside the first middle core portion 301. A resin core piece has low thermal conductivity and tends to reach high temperatures. This means that the temperature of the coil 10 is likely to rise at a part where the first middle core portion 301 is positioned. When the gap portion 30*g* is not present, by providing the temperature sensor 50 to the outside of the first middle core portion 301, the temperature of the coil 10 can be measured at the part where the first middle core portion 301, which reaches a high temperature, is positioned.

[Prototype 1]

A coil 10 was manufactured using the method for manufacturing a coil according to the above embodiment.

The specification of the coil 10 to be manufactured was as follows. The shape of the coil 10 was a quadrangular cylinder. The shape of the end surfaces of the coil 10 was rectangular. The number of first turns 21 to be formed was sixteen turns and the number of second turns 22 was sixteen turns.

The width of the inner peripheral portion 1*i* of the flat wire 1 held by the holding unit 810 was set at around 60% of the width of the flat wire 1. The width of the outer peripheral portion 1*e* of the flat wire 1 held by the guiding unit 820 was set at around 30% of the width of the flat wire 1. The displacement Gd of the guiding unit 820 during the step of forming the first turns 21 and the step of forming the second turns 22 was set at 0.2 mm.

For the manufactured coil 10, the first displacement 11*d* in the first turns 21 and the second displacement 12*d* in the second turns 22 were measured. The displacements were measured using the method for measuring the displacement described earlier in the above embodiment. The first displacement 11*d* and the second displacement 12*d* were measured at each of the four corner portions 20*c* and the average value was calculated. As a result, the displacements at the corner portions 20*c* of the first turns 21 and the second turns 22 were around 0.2 mm on average. The displacements at the midpoints of the four straight portions 20*s* were also measured and average values were calculated. In addition, each displacement was measured at the midpoint of the four straight portions 20*s*, and the average value was calculated. In more detail, the midpoint of each straight portion 20*s* was set as the midpoint of the length of each straight portion 20*s* along the circumferential direction of the first turns 21. As a result, the displacement at the straight portions 20*s* of the first turns 21 and the second turns 22 was around 0.1 mm on average.

The reason why the displacement at the straight portions 20*s* was smaller than the displacement at the corner portions 20*c* is believed to be as follows. Since the inner peripheral portion 1*i* of the flat wire 1 is sandwiched between the support 812 and the flange 813 during the edgewise bending, the inner peripheral portion 1*i* is fixed. This means that the flat wire 1 is easy to bend at the corner portions 20*c*. On the other hand, at the straight portions 20*s*, the support 812 and the flange 813 are held at a distance so that gaps are formed between these components and the inner peripheral portion 1*i*, which makes it difficult to apply a bending force to the flat wire 1 compared to at the corner portions 20*c*. It is believed that due to this relationship between the flat wire 1, the holding unit 810, and the guiding unit 820, the displacement at the straight portions 20*s* is smaller than the displacement at the corner portions 20*c*.

In addition, the size of the space 15 formed between the first coil portion 110 and the second coil portion 120 was measured. As a result, the size of the space 15 was around 0.4 mm.

<Converter and Power Converter Device>

A reactor 100 according to the present embodiment can be used in applications where the current satisfies the following conditions. Example current conditions are a maximum DC current of approximately 100 A or higher and 1000 A or lower, an average voltage of approximately 100 V or higher and 1000 V or lower, and a working frequency of approximately 5 kHz or higher and 100 kHz or lower. The reactor 100 according to the present embodiment can be typically used as a component in a converter mounted in a vehicle, such as an electric vehicle or a hybrid vehicle, or as a component in a power converter device equipped with such a converter.

Figure 13:
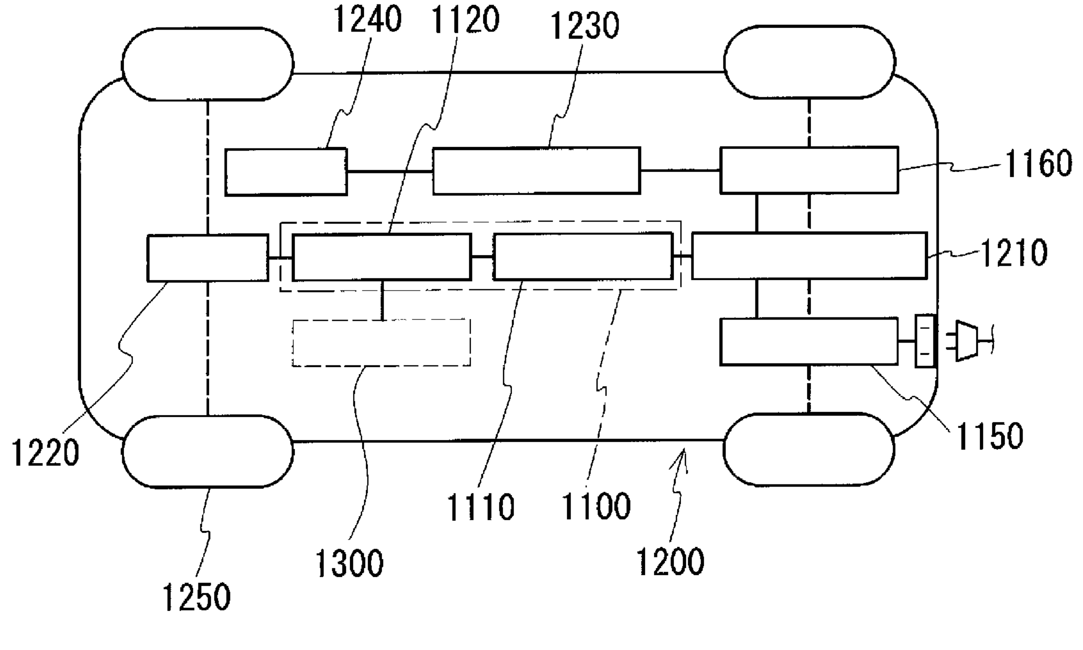
FIG. 13 is a configuration diagram schematically illustrating a power supply system of a hybrid vehicle.

As depicted in FIG. 13, a vehicle 1200, such as a hybrid vehicle or an electric vehicle, includes a main battery 1210, a power converter device 1100 connected to the main battery 1210, and a motor 1220 that is driven by power supplied from the main battery 1210 and is used to propel the vehicle. The motor 1220 is typically a three-phase AC motor that drives wheels 1250 during propulsion and functions as a generator during regeneration. In the case of a hybrid vehicle, the vehicle 1200 includes an engine 1300 in addition to the motor 1220. In FIG. 13, an inlet is depicted as a charging point of the vehicle 1200, but it is also possible for the vehicle to be provided with a plug.

The power converter device 1100 includes a converter 1110 that is connected to the main battery 1210 and an inverter 1120 that is connected to the converter 1110 and performs bidirectional conversion between a DC voltage and an AC voltage. When the vehicle 1200 is running, the converter 1110 depicted in this example boosts the input voltage of the main battery 1210 from around 200 V to 300 V to around 400 V to 700 V and supplies the boosted voltage to the inverter 1120. During regeneration, the converter 1110 steps down the input voltage outputted from the motor 1220 via the inverter 1120 to a suitable DC voltage for the main battery 1210 and charges the main battery 1210. This input voltage is a DC voltage. When the vehicle 1200 is running, the inverter 1120 converts the DC voltage that has been boosted by the converter 1110 into a predetermined AC voltage and supplies the AC voltage to the motor 1220. During regeneration, the inverter 1120 converts the AC voltage outputted from the motor 1220 to a DC voltage and outputs the DC voltage to the converter 1110.

Figure 14:
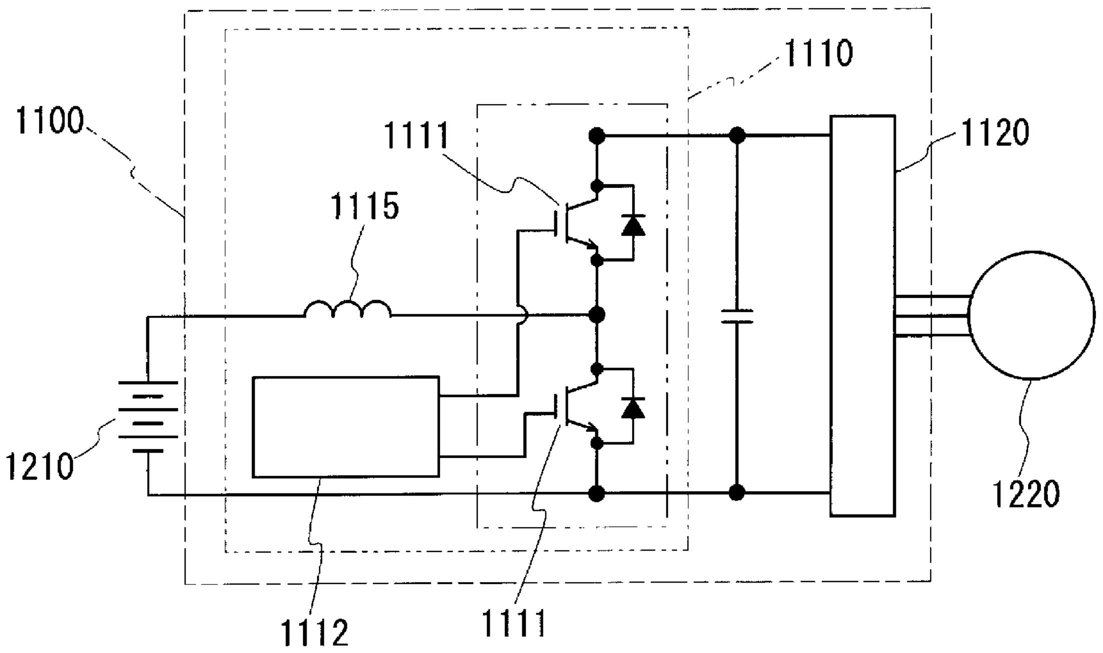
FIG. 14 is a circuit diagram illustrating an outline of an exemplary power converter device including a converter.

As depicted in FIG. 14, the converter 1110 includes a plurality of switching elements 1111, a drive circuit 1112 that controls the operation of the switching elements 1111, and a reactor 1115, and converts the input voltage by repeatedly switching on and off. The "conversion" of the input voltage here refers to boosting (stepping up) and stepping down. Power devices, such as field effect transistors or insulated gate bipolar transistors, are used for the switching elements 1111. The reactor 1115 has a function that uses the property of a coil in obstructing changes in the current that flows to a circuit to smooth such changes when the current increases or decreases due to switching operations. The reactor 100 according to the present embodiment is provided as the reactor 1115.

In addition to the converter 1110, the vehicle 1200 includes a power supply device converter 1150, which is connected to the main battery 1210, and an auxiliary power supply converter 1160, which is connected to a sub battery 1230 that serves as a power supply for auxiliary equipment 1240 and the main battery 1210 and converts the high voltage of the main battery 1210 to a low voltage. Although the converter 1110 typically performs DC-DC conversion, the power supply device converter 1150 and the auxiliary power supply converter 1160 perform AC-DC conversion. However, there are also power supply device converters 1150 that perform DC-DC conversion. Reactors with the same configuration as the reactor 100 according to the present embodiment but with sizes and shapes that have been changed as appropriate can be used for the reactors of the power supply device converter 1150 and the auxiliary power converter 1160. The reactor 100 according to the present embodiment can also be used for a converter that converts input power and that only steps up or only steps down.

LIST OF REFERENCE NUMERALS

100 Reactor
10 Coil
110 First coil portion
120 Second coil portion
121 First end portion
122 Second end portion
131, 132 Terminal portion
1 Flat wire
1*i* Inner peripheral portion
1*e* Outer peripheral portion
11*i* First inner peripheral portion
11*e* First outer peripheral portion
11*b* Bent portion
12*i* Second inner peripheral portion
12*e* Second outer peripheral portion
12*b* Bent portion
11*d* First displacement
12*d* Second displacement
15 Space
2 Turn
20*s* Straight portion
20*c* Corner portion
21 First turn
22 Second turn
21*g*, 22*g* Gap
30 Magnetic core
31 First core
32 Second core
30*i* Inner core portion
30*g* Gap portion
300 Middle core portion
301 First middle core portion
302 Second middle core portion
310 First end core portion
320 Second end core portion
330 First side core portion
340 Second side core portion
41, 42 Holding member
43 Through hole
50 Temperature sensor
70 Fixing material
800 Bending unit
810 Holding unit
811 Shaft
812 Support
813 Flange
812*f* First surface
813*f* Second surface
820 Guiding unit
821 Guide groove
1100 Power converter device
1110 Converter
1111 Switching element
1112 Drive circuit
1115 Reactor
1120 Inverter
1150 Power supply device converter
1160 Auxiliary power supply converter
1200 Vehicle
1210 Main battery
1220 Motor
1230 Sub-battery
1240 Auxiliary equipment
1250 Wheel
1300 Engine
Gd Displacement
L Total length of coil
$L_1$ Total length of first coil portion
$L_2$ Total length of second coil portion

What is claimed is:

1. A reactor comprising:
a coil;
a magnetic core on which the coil is disposed; and
a temperature sensor for measuring a temperature of the coil,
wherein the coil includes a first coil portion and a second coil portion that is continuously connected to the first coil portion in an axial direction of the coil,
the first coil portion includes a plurality of first turns where a flat wire is wound edgewise into a spiral,
each of the plurality of first turns includes a first inner peripheral portion that constructs an inner periphery side of the first turn in the flat wire and a first outer peripheral portion that constructs an outer periphery side of the first turn in the flat wire,
the first outer peripheral portion is bent with respect to the first inner peripheral portion so as to be inclined in a first direction in the axial direction of the coil,
the second coil portion includes a plurality of second turns where the flat wire is wound edgewise into a spiral,
each of the plurality of second turns includes a second inner peripheral portion that constructs an inner periphery side of the second turn in the flat wire and a second outer peripheral portion that constructs an outer periphery side of the second turn in the flat wire,
the second outer peripheral portion is bent with respect to the second inner peripheral portion so as to be inclined toward a second direction in the axial direction of the coil, and
the temperature sensor is disposed in a space formed between the first coil portion and the second coil portion.

2. The reactor according to claim 1,
wherein the temperature sensor is fixed to one of a first turn and a second turn that face each other.

3. The reactor according to claim 2, wherein the temperature sensor is positioned at one of a first inner peripheral portion and a second inner peripheral portion.

4. The reactor according to claim 1,
wherein the magnetic core includes:
an inner core portion disposed inside the coil; and
a gap portion provided midway in a length direction of the inner core portion,
wherein the gap portion is disposed inside of the space.

5. The reactor according to claim 1,
wherein the magnetic core includes an inner core portion disposed inside the coil,
the inner core portion includes a resin core piece made of a molding of a composite material where soft magnetic powder is dispersed in resin, and
the resin core piece is disposed inside the space.

6. The reactor according to claim 1,
wherein the first turns include corner portions where the flat wire is bent,
a first displacement in the axial direction of the coil between the first inner peripheral portion and the first outer peripheral portion at the corner portions of the first turns is 0.1 mm or more and 1.0 mm or less,
the second turns include corner portions where the flat wire is bent, and
a second displacement in the axial direction of the coil between the second inner peripheral portion and the second outer peripheral portion at the corner portions of the second turns is 0.1 mm or more and 1.0 mm or less.

7. A converter comprising the reactor according to claim 1.

8. A power converter device comprising the converter according to claim 7.

* * * * *